United States Patent
Ylamurto et al.

(10) Patent No.: US 10,575,275 B2
(45) Date of Patent: Feb. 25, 2020

(54) SYSTEMS AND METHODS FOR ADAPTIVELY SELECTING DISTANCE ESTIMATES FOR LOCALIZATION OF NODES BASED ON ERROR METRIC INFORMATION

(71) Applicant: LOCIX Inc., San Bruno, CA (US)

(72) Inventors: Tommi Ylamurto, Los Gatos, CA (US); Manu Seth, Berkeley, CA (US)

(73) Assignee: Locix, Inc., San Bruno, CA (US)

( * ) Notice: Subject to any disclaimer, the term of this patent is extended or adjusted under 35 U.S.C. 154(b) by 0 days.

(21) Appl. No.: 15/684,891

(22) Filed: Aug. 23, 2017

(65) Prior Publication Data

US 2019/0069263 A1 Feb. 28, 2019

(51) Int. Cl.
| | |
|---|---|
| *H04W 64/00* | (2009.01) |
| *G01S 5/02* | (2010.01) |
| *G01S 13/76* | (2006.01) |
| *G01S 5/14* | (2006.01) |

(52) U.S. Cl.
CPC ......... *H04W 64/003* (2013.01); *G01S 5/0205* (2013.01); *G01S 5/0289* (2013.01); *G01S 13/765* (2013.01); *G01S 5/14* (2013.01)

(58) Field of Classification Search
CPC .............................. H04W 84/18; H04W 4/005
See application file for complete search history.

(56) References Cited

U.S. PATENT DOCUMENTS

| 8,102,784 B1* | 1/2012 | Lemkin | G01S 5/0289 370/252 |
| 2004/0147267 A1* | 7/2004 | Hill | H04W 64/00 455/441 |
| 2005/0246334 A1 | 11/2005 | Tao et al. | |
| 2005/0271057 A1 | 12/2005 | Kim et al. | |

(Continued)

FOREIGN PATENT DOCUMENTS

| WO | 2017210359 | 12/2017 |
| WO | 2019040556 A1 | 8/2018 |

OTHER PUBLICATIONS

Chan, Y. T., et al., "A Simple and Efficient Estimator for Hyperbolic Location", IEEE Transactions on Signal Processing, Year: 1994, vol. 42, Issue: 8, 11 pages.

(Continued)

*Primary Examiner* — Ernest G Tacsik
(74) *Attorney, Agent, or Firm* — Jaffery Watson Mendonsa & Hamilton LLP

(57) ABSTRACT

Systems and methods for adaptively determining locations of wireless nodes in a network architecture are disclosed herein. In one example, a system includes a first plurality of wireless sensor nodes each having a known location and a second plurality of wireless sensor nodes each having an unknown location in a wireless network architecture. One or more processing units of a wireless sensor node of the first plurality of wireless nodes are configured to execute instructions to determine distance estimates between the first plurality of wireless sensor nodes and the second plurality of (Continued)

wireless sensor nodes for localization, determine error metric information for each distance estimate, and adaptively select the determined distance estimates for localization based on the error metric information.

26 Claims, 16 Drawing Sheets

(56) References Cited

U.S. PATENT DOCUMENTS

| | | |
|---|---|---|
| 2007/0005292 A1* | 1/2007 | Jin .................. G01S 5/0289 702/150 |
| 2010/0150117 A1 | 6/2010 | Aweya et al. |
| 2010/0248637 A1 | 9/2010 | Sahinoglu et al. |
| 2011/0287783 A1 | 11/2011 | Alizadeh-Shabdiz et al. |
| 2013/0170484 A1* | 7/2013 | Kang .................. G01S 5/021 370/338 |
| 2014/0045518 A1* | 2/2014 | Sathyan .............. H04W 4/023 455/456.1 |
| 2017/0353940 A1 | 12/2017 | Seth |
| 2017/0367065 A1 | 12/2017 | Seth |

OTHER PUBLICATIONS

Giustiniano, Domenico, et al., "CAESAR: Carrier Sense-Based Ranging in Off-The-Shelf 802.11 Wireless LAN", ACM CoNEXT 2011, Dec. 6-9, 2011, Tokyo, Japan, 12 pages.
Isokawa, Teijiro, et al., "An Anchor-Free Localization Scheme with Kalman Filtering in ZigBee Sensor Network", Hindawi Publishing Corporation, ISRN Sensor Networks, vol. 2013 (Jan. 23, 2013) Article ID 356231, 11 pages.
Kotaru, Manikanta, et al., "SpotFi: Decimeter Level Localization Using WiFi", SIGCOMM '15, Aug. 17-21, 2015, London, United Kingdom, 14 pages.
Mariakakis, Alex, et al., "SAIL: Sincle Access Point-Based Indoor Localization", MobiSys '14, Jun. 16-19, 2014, Bretton Woods, New Hampshire, USA, 14 pages.
Priyantha, Nissanka B., et al., "Anchor-Free Distributed Localization in Sensor Networks", Tech Report #892, Apr. 15, 2003, MIT Laboratory for Computer Science, http://nms.lcs.mit.edu/cricket/, 13 pages.
Sarkar, Tapan K., et al., "Using the Matrix Pencil Method to Extimate the Parameters of a Sum of Complex Exponentials", IEEE Antennas and Propagation Magazine, vol. 37, No. 1, Feb. 1995, 8 pages.
Shang, Yi, et al., "Improved MDS-Based Localization", INFOCOM 2004. Twenty-third Annual Joint Conference of the IEEE Computer and Communications Societies, Year: 2004, vol. 4, 12 pages.
Simonetto, Andrea, et al., "Distributed Maximum Likelihood Sensor Network Localization", IEEE Transactions on Signal Processing, Year: 2014, vol. 62, Issue: 6, 14 pages.
Vasisht, Deepak, et al., "Decimeter-Level Localization with a Single WiFi Access Point", Proceedings of the 13th USENIX Symposium on Networked Systems Design and Implementation (NSDI '16), Mar. 16-18, 2016, Santa Clara, CA, USA, 15 pages.
Vasisht, Deepak, et al., "Sub-Nanosecond Time of Flight on Commercial Wi-Fi Cards", arXiv:1505.03446v1 [cs.NI], May 13, 2015, 14 pages.
Wang, Yue, "Linear Least Squares Localization in Sensor Networks", EURASIP Journal on Wireless Communications and Networking, Mar. 5, 2016, 7 pages.
Wibowo, Sigit B., et al., "Time of Flight Ranging using Off-the-self UEEE802.11 WiFi Tags", Centre for Adaptive Wireless Systems, Department of Electronic Engineering, Cork Institute of Technology, Bishopstown, Cork, Ireland, Dec. 2008, 5 pages.
Xie, Yaxiong, et al., "Precise Power Delay Profiling with Commodity WiFi", MobiCom '15, Sep. 7-11, 2015, Paris, France, 12 pages.
Xu, Yurong, et al., "Mobile Anchor-Free Localization for Wireless Sensor Networks", Distributed Computing in Sensor Systems, Third IEEE International Conference, DCOSS 2007, Santa Fe, NM, USA, Jun. 18-20, 2007, pp. 96-109.
Youssef, A., et al., "Accurate Anchor-Free Node Localization in Wireless Sensor Networks", PCCC 2005. 24th IEEE International Performance, Computing, and Communications Conference, 2005, 14 pages.
International Search Report and Written Opinion for PCT/US2018/047420 (P010PCT), dated Jan. 4, 2019, 14 pages.

* cited by examiner

Received packet on device 520

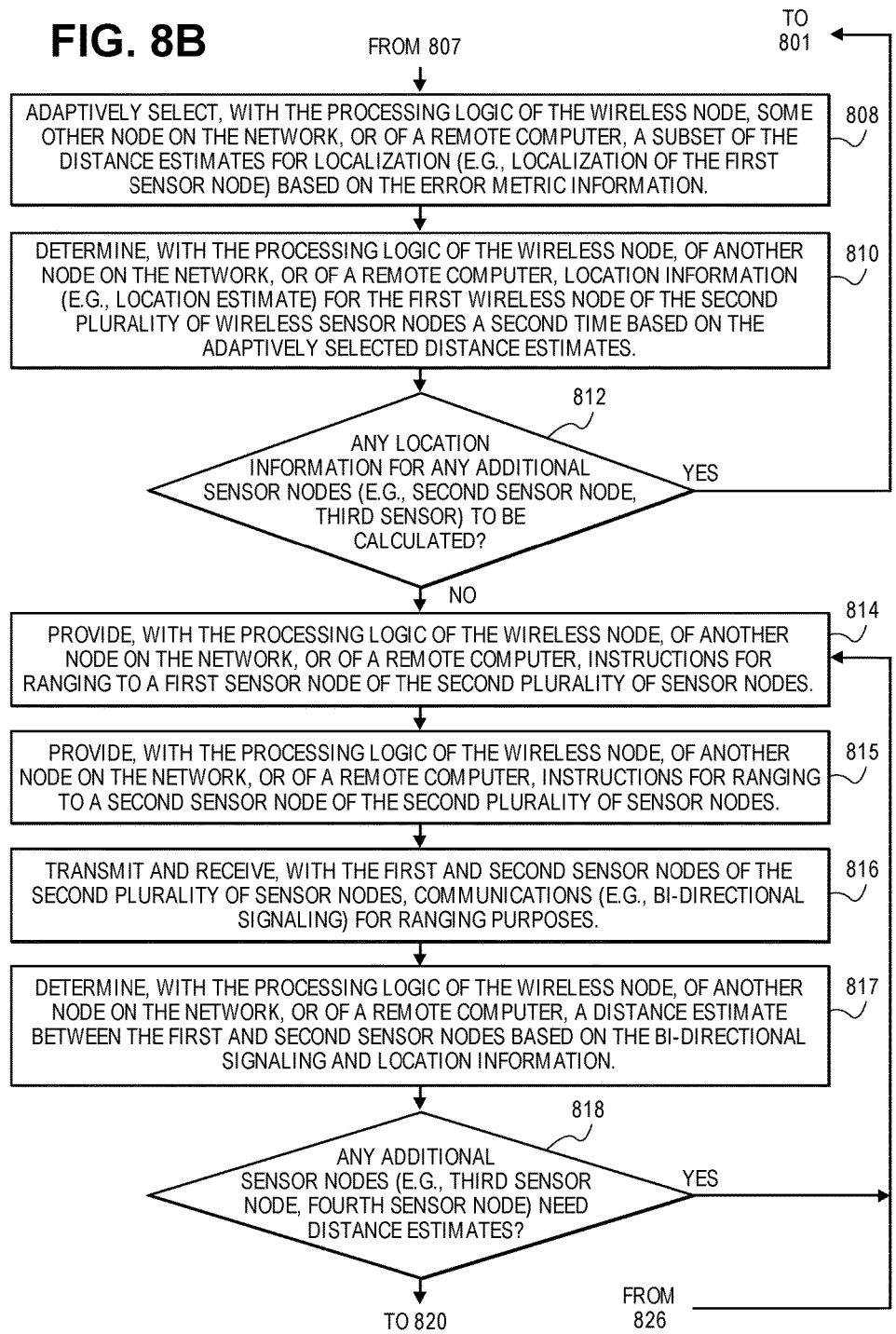

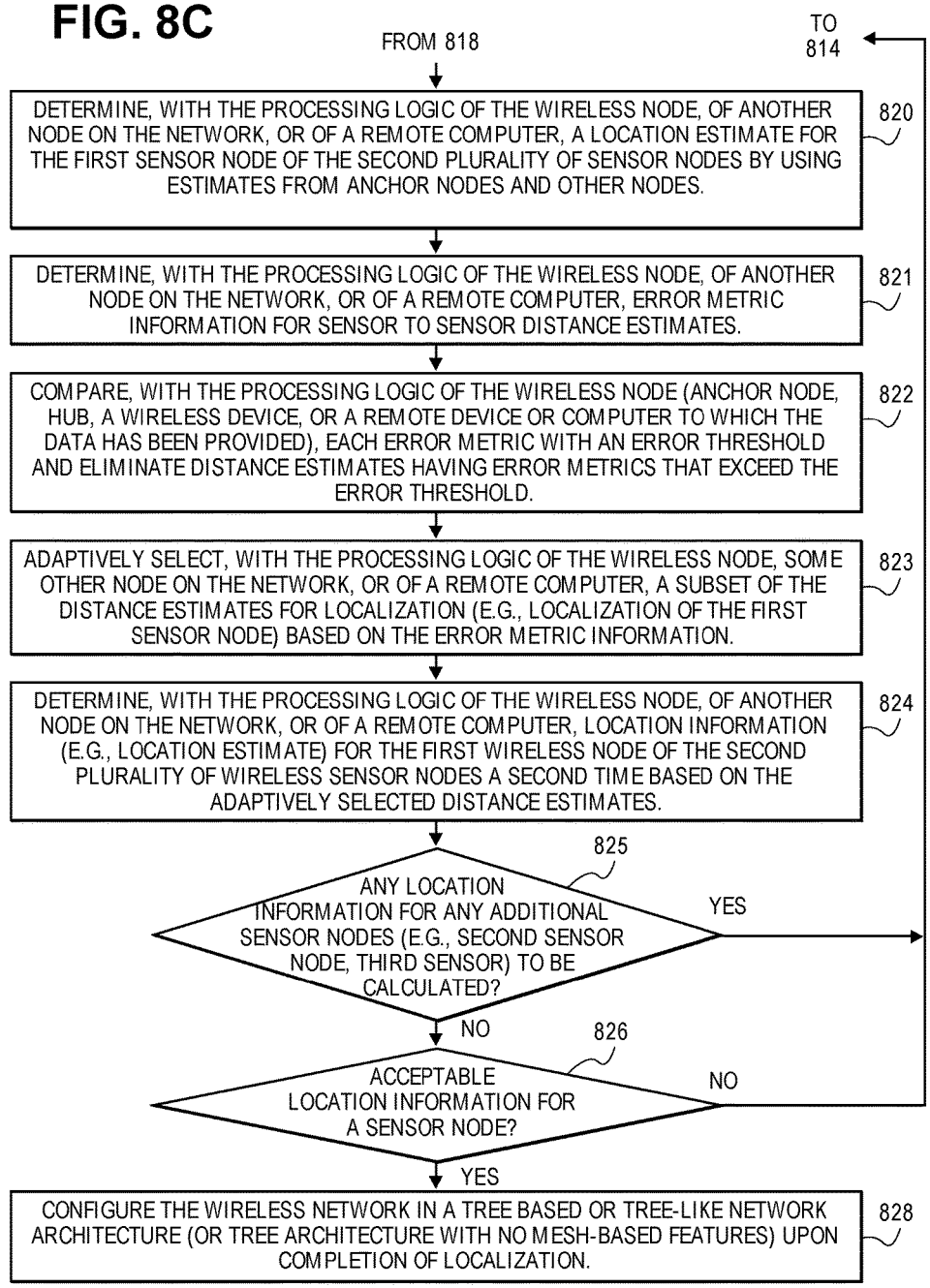

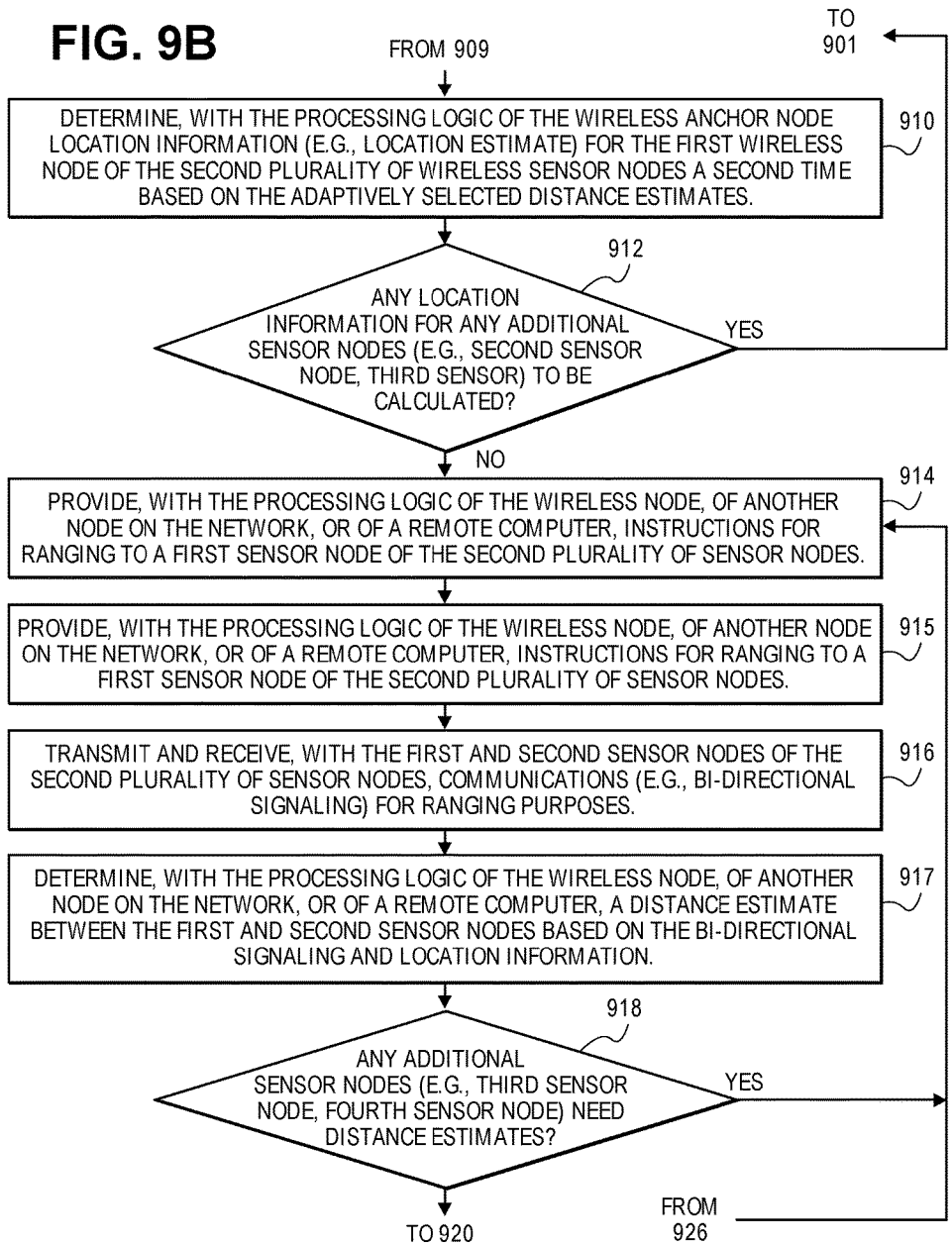

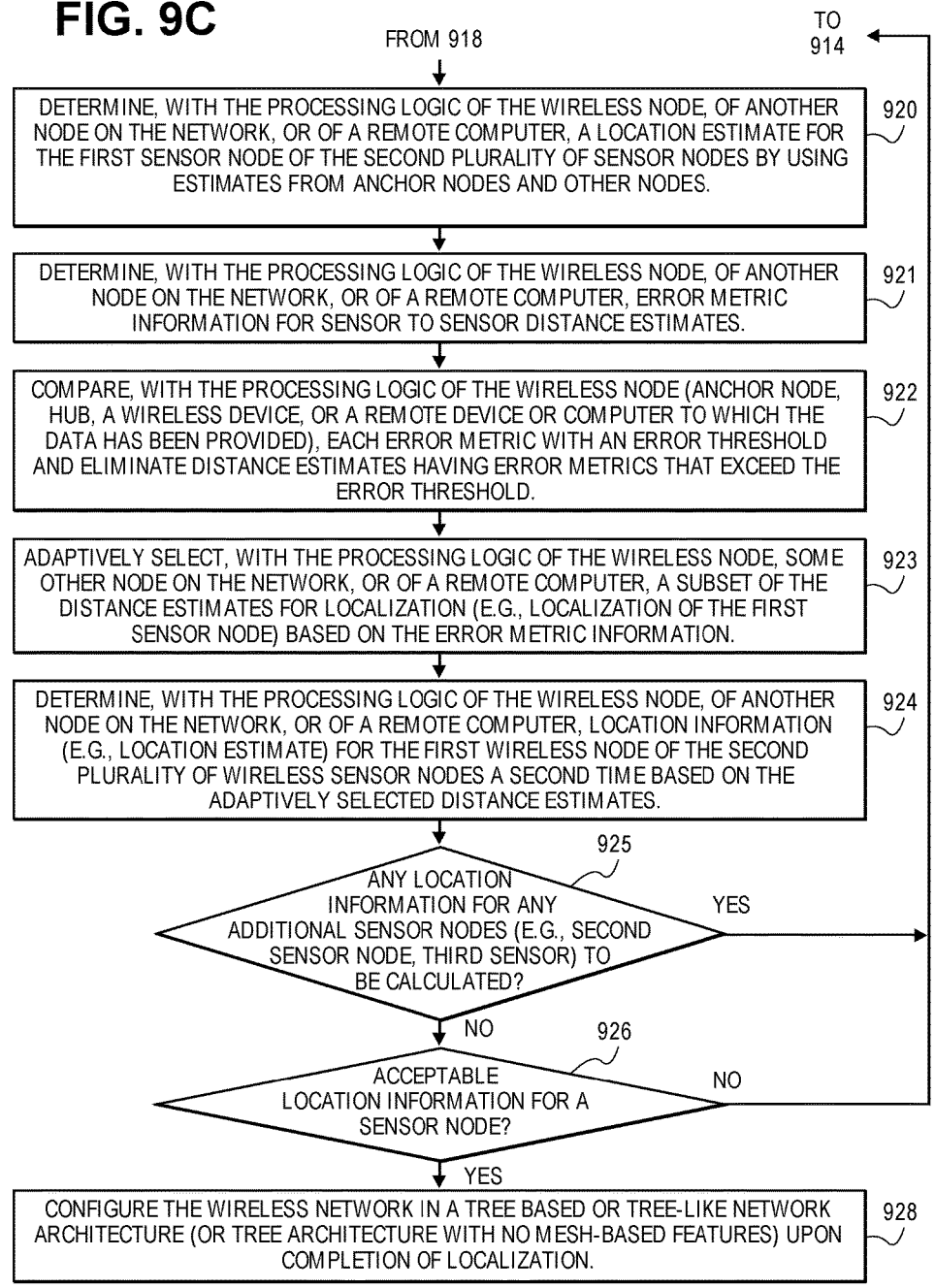

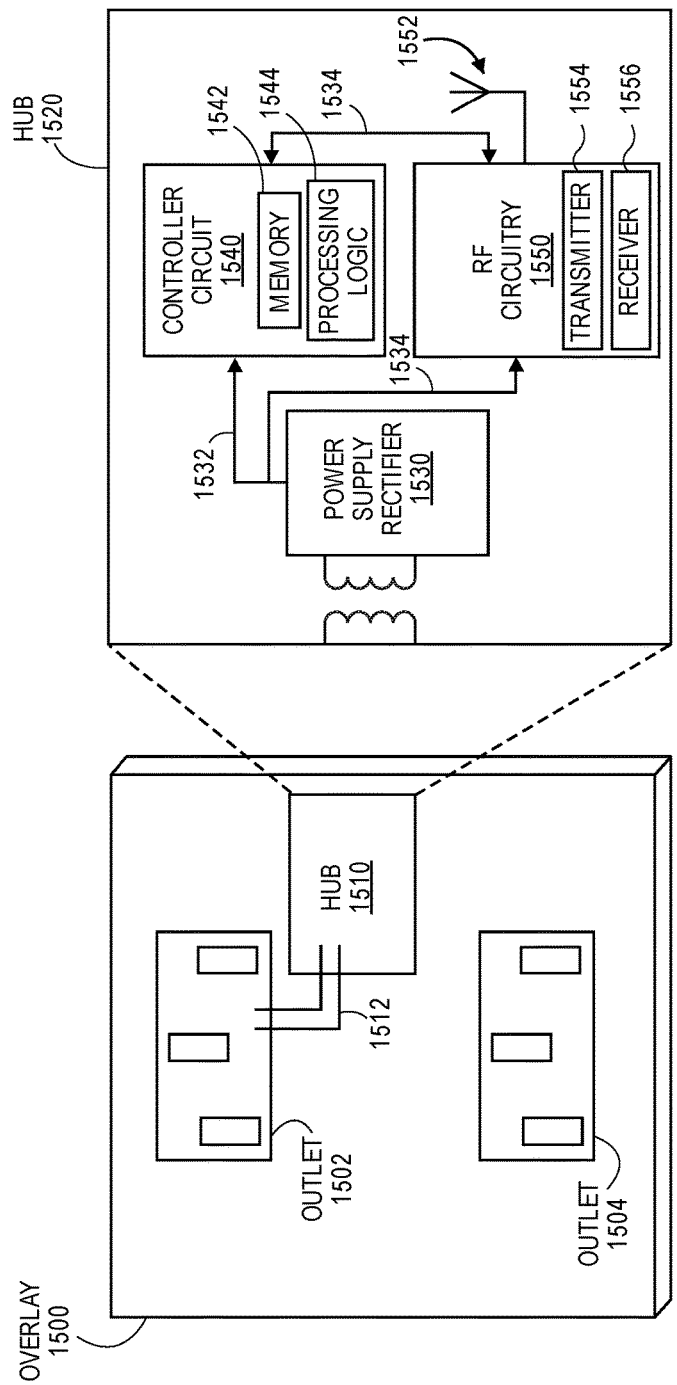

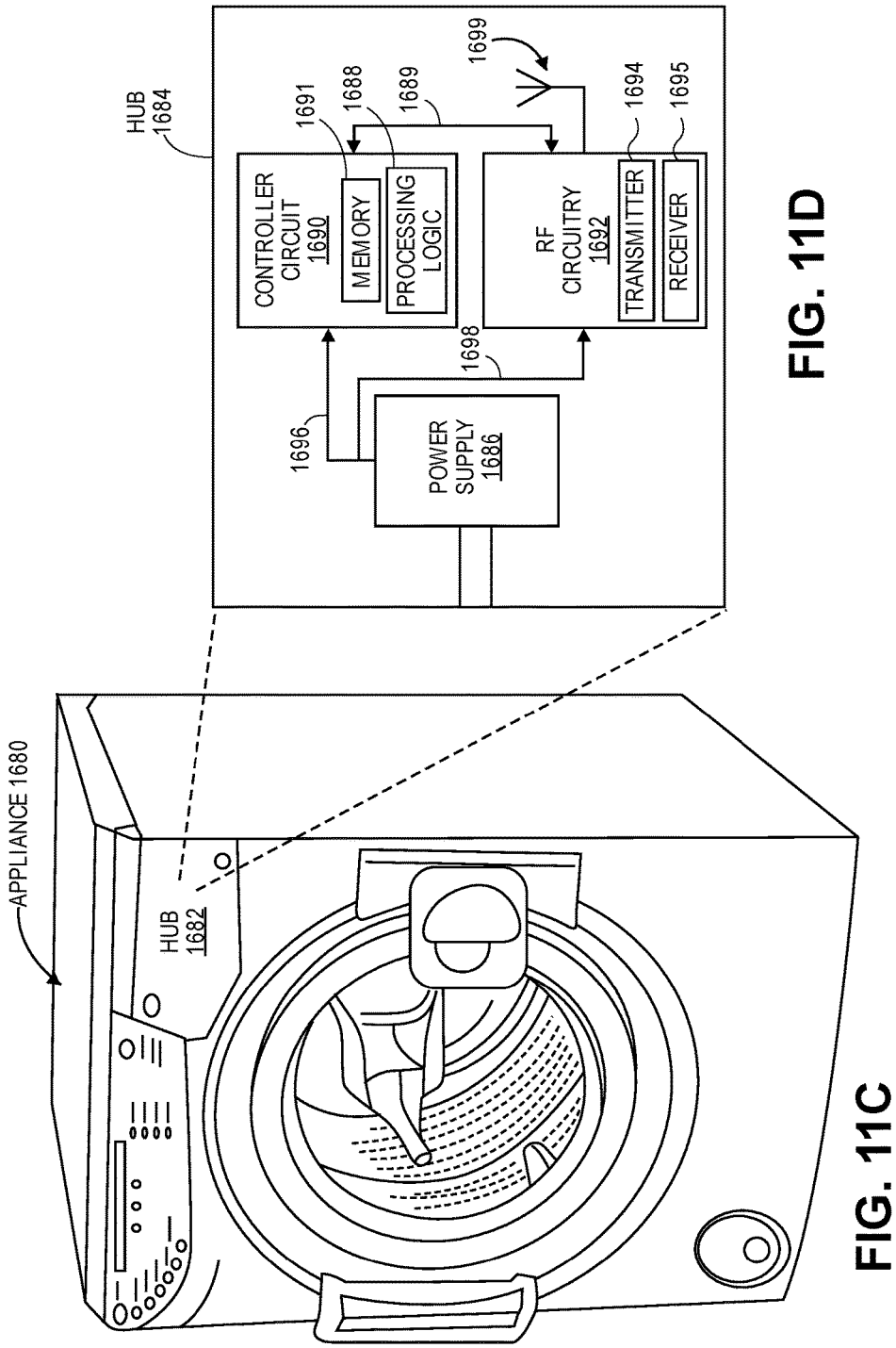

SYSTEMS AND METHODS FOR ADAPTIVELY SELECTING DISTANCE ESTIMATES FOR LOCALIZATION OF NODES BASED ON ERROR METRIC INFORMATION

RELATED APPLICATIONS

This application is related to application Ser. No. 14/830,668, filed Aug. 19, 2015, entitled: SYSTEMS AND METHODS FOR DETERMINING LOCATIONS OF WIRELESS SENSOR NODES IN A TREE NETWORK ARCHITECTURE HAVING MESH-BASED FEATURES; and application Ser. No. 15/173,531, filed Jun. 3, 2016, entitled: SYSTEMS AND METHODS FOR PRECISE RADIO FREQUENCY LOCALIZATION IN THE PRESENCE OF MULTIPLE COMMUNICATION PATHS, which are both incorporated by reference herein.

FIELD

Embodiments of the invention pertain to systems and methods for adaptively selecting distance estimates for localization of nodes based on error metric information.

BACKGROUND

In the consumer electronics and computer industries, wireless sensor networks have been studied for many years. In archetypal wireless sensor networks, one or more sensors are implemented in conjunction with a radio to enable wireless collection of data from one or more sensor nodes deployed within a network. Each sensor node may include one or more sensors, and will include a radio and a power source for powering the operation of the sensor node. Location detection of nodes in indoor wireless networks is useful and important in many applications.

Localization based on triangulation performed using radio frequency measurements is an attractive method for determining location of wirelessly equipped objects in three dimensional space. RF-based localization may be performed in numerous ways. Distances between multiple object pairs must be determined to enable calculation of relative positions in three dimensional space via triangulation methods (e.g., least squares, global search, gradient descent) based on the individual pair distances. An exemplary implementation includes a hub and multiple sensor nodes. Note that the hub may be replaced with a node, or indeed, one or more of the nodes may be replaced with a hub. Distances are estimated using radio frequency techniques between all the individual pairs via RF communications. Once the distance is estimated, triangulation may be used to determine the relative position in three dimensional space of each object. If the position of at least 2 of the objects is known in real space, then the absolute position of each object in the network may be determined. Indeed, if the position of 1 object (e.g., the hub) is known within the network, along with the angular path to at least one other node, then again the absolute position of each object within the network may be determined.

Distance measurement between object pairs is therefore a key step in RF-based localization. Distance estimation may be performed in numerous ways. Signal strength of communication (RSSI) may be measured between pairs and used to estimate distance based on known models of signal attenuation. Time of Flight (TOF) may be measured for signals transmitted between objects and distance may be estimated based on known propagation delay models. Angle of arrival (AOA) may additionally be estimated based on resolution of angular variation in signal strength. Of these, RSSI is often prone to error due to variations in attenuation, and is therefore less attractive than TOF for distance estimation.

TOF based distance estimation is susceptible to error due to reflections causing the presence of multiple paths between two objects. In this situation, the estimated path may be detected as being longer than the real path due to the reflected path being longer than the direct path. If the system estimates the TOF based on the reflected path, then errors are introduced in triangulation.

SUMMARY

For one embodiment of the present invention, systems and methods for determining locations of wireless sensor nodes in a network architecture are disclosed herein. In one example, a system for localization of nodes in a wireless network architecture includes a first plurality of wireless sensor nodes each having a known location and a wireless device with one or more processing units and RF circuitry for transmitting and receiving communications in the wireless network architecture. The system also includes a second plurality of wireless sensor nodes each having an unknown location and a wireless device with RF circuitry for transmitting and receiving communications in the wireless network architecture. The one or more processing units of a wireless sensor node of the first plurality of wireless nodes are configured to execute instructions to determine distance estimates between the first plurality of wireless sensor nodes and the second plurality of wireless sensor nodes for localization, determine error metric information for each distance estimate, and adaptively select the determined distance estimates for localization based on the error metric information.

In another example, a computer-implemented method for localization of wireless sensor nodes in a wireless network architecture includes determining distance estimates between a first plurality of wireless sensor nodes having known locations and a second plurality of wireless sensor nodes having unknown locations. The method further includes determining error metric information for each distance estimate, adaptively selecting distance estimates based on the error metric information, and determining location information for the second plurality of wireless sensor nodes based on the adaptively selected distance estimates.

Other features and advantages of embodiments of the present invention will be apparent from the accompanying drawings and from the detailed description that follows below.

BRIEF DESCRIPTION OF THE DRAWINGS

Embodiments of the present invention are illustrated by way of example and not limitation in the figures of the accompanying drawings, in which like references indicate similar elements, and in which:

FIGS. 8A-8C illustrate a localizing method for determining location estimation of nodes by adaptively selecting distance estimates of nodes based on error metric information in accordance with one embodiment.

FIGS. 9A-9C illustrate a localizing method for determining location estimation of nodes by adaptively selecting distance estimates of nodes based on error metric information in accordance with another embodiment FIG. 10A shows an exemplary embodiment of a hub implemented as an overlay 1500 for an electrical power outlet in accordance with one embodiment.

FIG. 10B shows an exemplary embodiment of an exploded view of a block diagram of a hub implemented as an overlay for an electrical power outlet in accordance with one embodiment.

FIG. 11C shows an exemplary embodiment of a hub implemented within an appliance (e.g., smart washing machine, smart refrigerator, smart thermostat, other smart appliances, etc.) in accordance with one embodiment.

FIG. 11D shows an exemplary embodiment of an exploded view of a block diagram of a hub 1684 implemented within an appliance (e.g., smart washing machine, smart refrigerator, smart thermostat, other smart appliances, etc.) in accordance with one embodiment.

DETAILED DESCRIPTION

Figure 1:
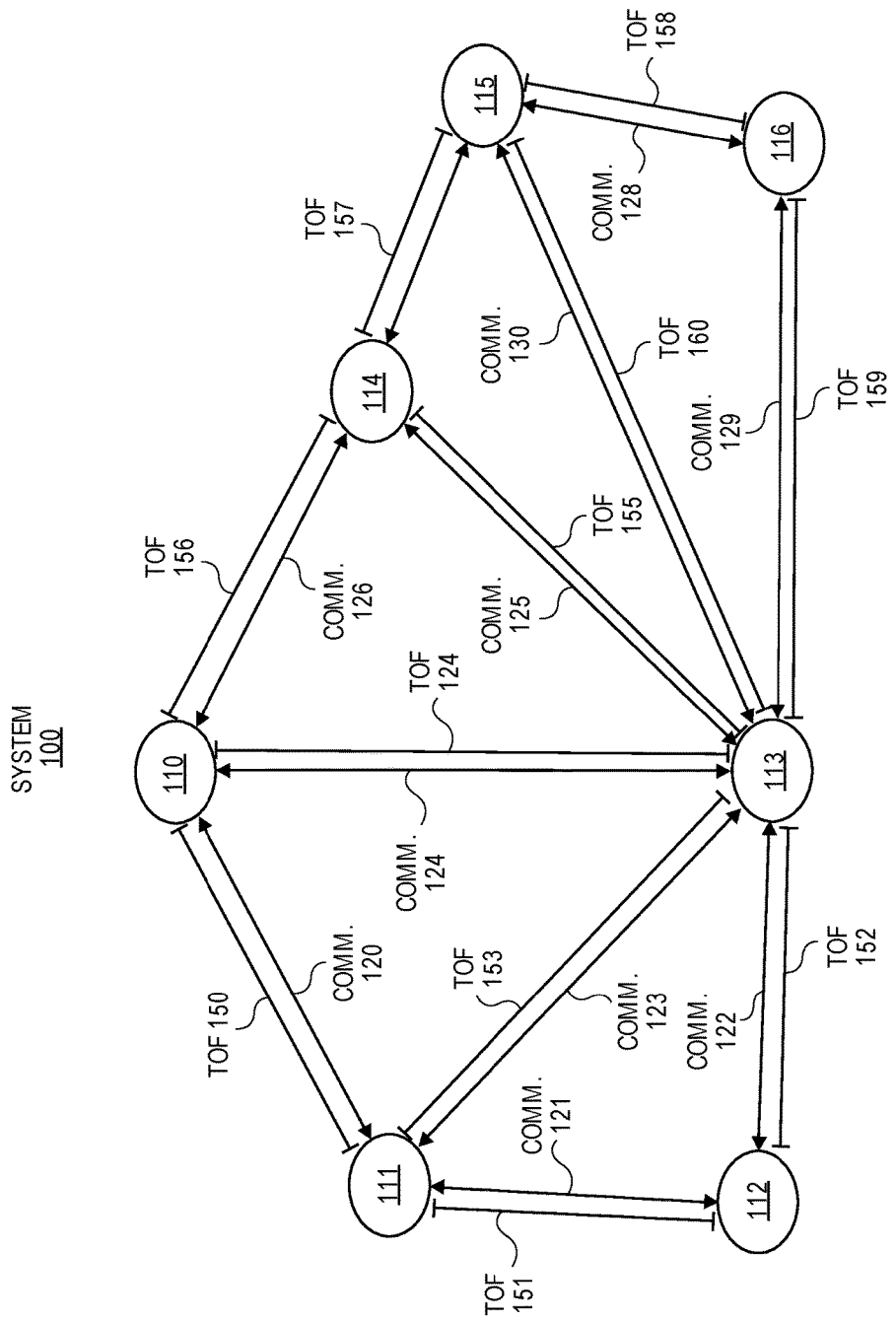
FIG. 1 illustrates an exemplar system of wireless nodes in accordance with one embodiment.

Systems and methods for precise radio frequency localization in the presence of multiple communication paths are disclosed herein. In one example, a system for localization of nodes in a wireless network architecture includes a first plurality of wireless sensor nodes each having a known location and a wireless device with one or more processing units and RF circuitry for transmitting and receiving communications in the wireless network architecture. The system also includes a second plurality of wireless sensor nodes each having an unknown location and a wireless device with RF circuitry for transmitting and receiving communications in the wireless network architecture. The one or more processing units of a wireless sensor node of the first plurality of wireless nodes are configured to execute instructions to determine distance estimates between the first plurality of wireless sensor nodes and the second plurality of wireless sensor nodes for localization, determine error metric information for each distance estimate, and adaptively select the determined distance estimates for localization based on the error metric information.

In various applications of wireless sensor networks, it may be desirable to determine the location of sensor nodes within the network. For example, such information may be used to estimate the relative position of sensors such as security cameras, motion sensors, temperature sensors, and other such sensors as would be apparent to one of skill in the art. This information may then be used to produce augmented information such as maps of temperature, motion paths, and multi-view image captures. Therefore, localization systems and methods are desired to enable accurate, low-power, and context-aware localization of nodes in wireless networks, particularly in indoor environments. For the purpose of this, indoor environments are also assumed to include near-indoor environments such as in the region around building and other structures, where similar issues (e.g., presence of nearby walls, etc.) may be present.

A wireless sensor network is described for use in an indoor environment including homes, apartments, office and commercial buildings, and nearby exterior locations such as parking lots, walkways, and gardens. The wireless sensor network may also be used in any type of building, structure, enclosure, vehicle, boat, etc. having a power source. The sensor system provides good battery life for sensor nodes while maintaining long communication distances.

Embodiments of the invention provide systems, apparatuses, and methods for localization detection in indoor environments. U.S. patent application Ser. No. 14/830,668 filed on Aug. 19, 2015, which is incorporated by reference herein, discloses techniques for RF-based localization. Specifically, the systems, apparatuses, and methods implement localization in a wireless sensor network that primarily uses a tree network structure for communication with periodic mesh-based features for path length estimation when localization is needed. The wireless sensor network has improved accuracy of localization while simultaneously providing good quality of indoor communication by using high-frequencies for localization and lower frequencies for communication.

Tree-like wireless sensor networks are attractive for many applications due to their reduced power requirements associated with the radio signal reception functionality. An exemplar tree-like network architecture has been described in U.S. patent application Ser. No. 14/607,045 filed on Jan. 29, 2015, U.S. patent application Ser. No. 14/607,047 filed on Jan. 29, 2015, U.S. patent application Ser. No. 14/607,048 filed on Jan. 29, 2015, and U.S. patent application Ser. No. 14/607,050 filed on Jan. 29, 2015, which are incorporated by reference in entirety herein.

Another type of wireless network that is often used is a mesh network. In this network, communication occurs between one or more neighbors, and information may then be passed along the network using a multi-hop architecture. This may be used to reduce transmit power requirements, since information is sent over shorter distances. On the other hand, receive radio power requirements may increase, since it is necessary for the receive radios to be on frequently to enable the multi-hop communication scheme.

Based on using the time of flight of signals between nodes in a wireless network, it is possible to estimate distance between individual pairs of nodes in a wireless network by exploiting the fact that the speed of signal propagation is relatively constant. Embodiments of the present network architecture allow measuring multiple pairs of path lengths and performing triangulation and then estimating the relative location of individual nodes in three-dimensional space.

FIG. 1 illustrates an exemplar system of wireless nodes in accordance with one embodiment. This exemplar system 100 includes wireless nodes 110-116. The nodes communicate bi-directionally with communications 120-130 (e.g., node identification information, sensor data, node status information, synchronization information, localization information, other such information for the wireless sensor network, time of flight (TOF) communications, etc.). Based on using time of flight measurements, path lengths (e.g., distance estimates) between individual pairs of nodes can be estimated. An individual time of flight measurement between nodes 110 and 111 for example, can be achieved by sending a signal at a known time from node 110 to node 111. Node 111 receives the signal, records a time stamp of reception of the signal of the communications 120, and can then, for example, send a return signal back to A, with a time stamp of transmission of the return signal. Node 110 receives the signal and records a time stamp of reception. Based on these two transmit and receive time stamps, an average time of flight between nodes 110 and 111 can be estimated. This process can be repeated multiple times and at multiple frequencies to improve precision and to eliminate or reduce degradation due to poor channel quality at a specific frequency. A set of path lengths can be estimated by repeating this process for various node pairs. For example, in FIG. 1, the path lengths are TOF 150-160. Then, by using a geometric model, the relative position of individual nodes can be estimated based on a triangulation-like process.

In one embodiment, a localizing method for determining location estimation of nodes includes adaptively selecting distance estimates of nodes based on error metric information. One or more distance estimates can be excluded based on error metrics for these distance estimates exceeding an error threshold.

This triangulation process is not feasible in a tree-like network, since only path lengths between any node and a hub can be measured. This then limits localization capability of a tree network. To preserve the energy benefits of a tree network while allowing localization, in one embodiment of this invention, a tree network for communication is combined with mesh-like network functionality for localization. Once localization is complete with mesh-like network functionality, the network switches back to tree-like communication and only time of flights between the nodes and the hub are measured periodically. Provided these time of flights are held relatively constant, the network then assumes nodes have not moved and does not waste energy is attempting to re-run mesh-based localization. On the other hand, when a change in path length in the tree network is detected, the network switches to a mesh-based system and re-triangulates to determine location of each node in the network.

Figure 2:
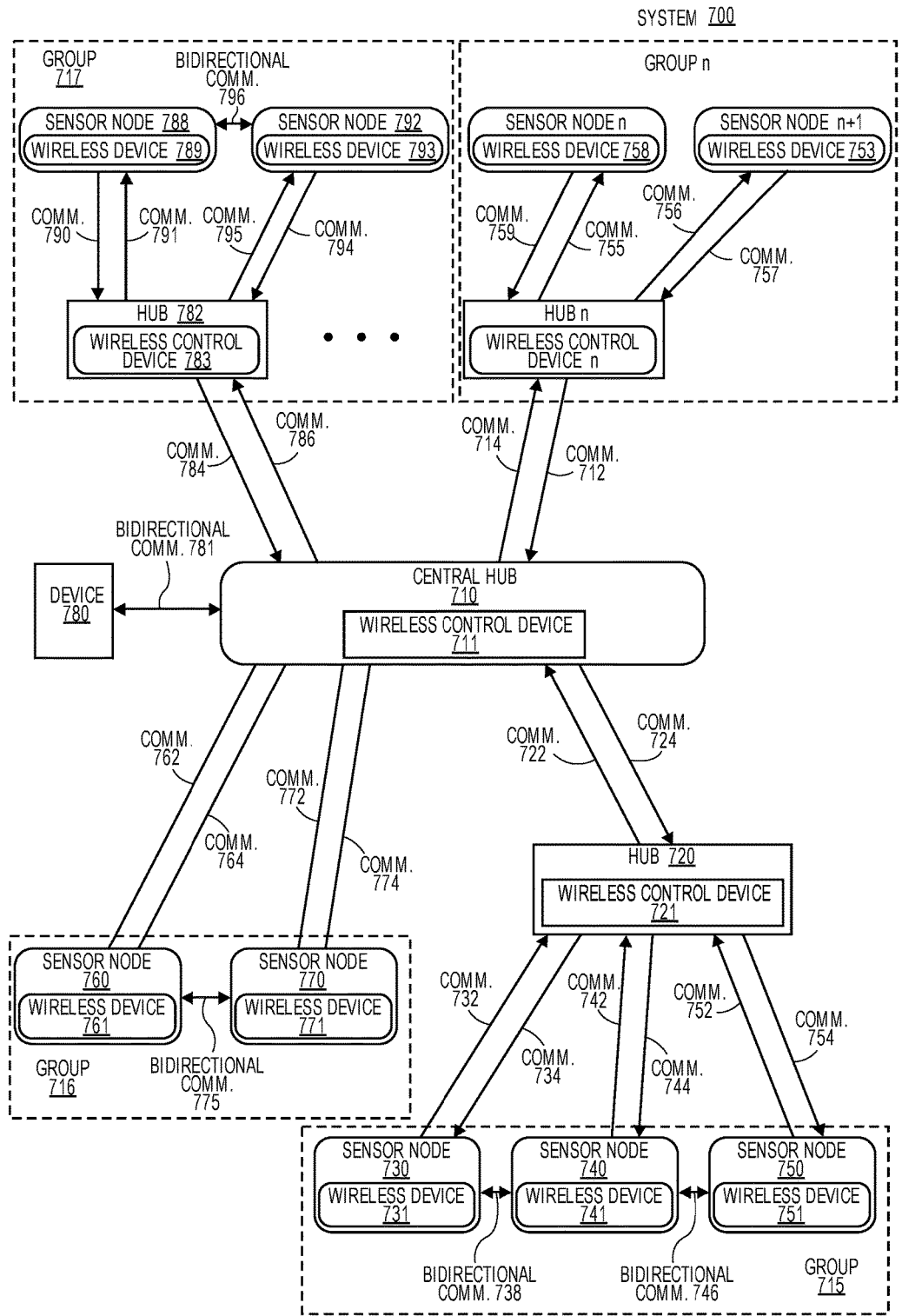
FIG. 2 shows a system with an asymmetric tree and mesh network architecture having multiple hubs for communicating in accordance with one embodiment.

FIG. 2 shows a system with an asymmetric tree and mesh network architecture having multiple hubs for communicating in accordance with one embodiment. The system 700 includes a central hub 710 having a wireless control device 711, hub 720 having a wireless control device 721, hub 782 having a wireless control device 783, and additional hubs including hub n having a wireless control device n. Additional hubs which are not shown can communicate with the central hub 710, other hubs, or can be an additional central hub. Each hub communicates bi-directionally with other hubs and one or more sensor nodes. The hubs are also designed to communicate bi-directionally with other devices including device 780 (e.g., client device, mobile device, tablet device, computing device, smart appliance, smart TV, etc.).

The sensor nodes 730, 740, 750, 760, 770, 788, 792, n, and n+1 (or terminal nodes) each include a wireless device 731, 741, 751, 761, 771, 789, 793, 758, and 753, respectively. A sensor node is a terminal node if it only has upstream communications with a higher level hub or node and no downstream communications with another hub or node. Each wireless device includes RF circuitry with a transmitter and a receiver (or transceiver) to enable bi-directional communications with hubs or other sensor nodes.

In one embodiment, the central hub 710 communicates with hubs 720, 782, hub n, device 780, and nodes 760 and 770. These communications include communications 722, 724, 774, 772, 764, 762, 781, 784, 786, 714, and 712 in the wireless asymmetric network architecture. The central hub having the wireless control device 711 is configured to send communications to other hubs and to receive communications from the other hubs for controlling and monitoring the wireless asymmetric network architecture including assigning groups of nodes and a guaranteed time signal for each group.

The hub 720 communicates with central hub 710 and also sensors nodes 730, 740, and 750. The communications with these sensor nodes include communications 732, 734, 742, 744, 752, and 754. For example, from the perspective of the hub 720, the communication 732 is received by the hub and the communication 734 is transmitted to the sensor node. From the perspective of the sensor node 730, the communication 732 is transmitted to the hub 720 and the communication 734 is received from the hub.

In one embodiment, a central hub (or other hubs) assign nodes 760 and 770 to a group 716, nodes 730, 740, and 750 to a group 715, nodes 788 and 792 to a group 717, and nodes n and n+1 to a group n. In another example, groups 716 and 715 are combined into a single group.

By using the architectures illustrated in FIGS. 1-2, nodes requiring long battery life minimize the energy expended on communication and higher level nodes in the tree hierarchy are implemented using available energy sources or may alternatively use batteries offering higher capacities or delivering shorter battery life. To facilitate achievement of long battery life on the battery-operated terminal nodes, communication between those nodes and their upper level counterparts (hereafter referred to as lowest-level hubs) may be established such that minimal transmit and receive traffic occurs between the lowest-level hubs and the terminal nodes.

In one embodiment, the nodes spend most of their time (e.g., more than 90% of their time, more than 95% of their time, approximately 98% or more than 99% of their time) in a low-energy non-communicative state. When the node wakes up and enters a communicative state, the nodes are operable to transmit data to the lowest-level hubs. This data may include node identification information, sensor data, node status information, synchronization information, localization information and other such information for the wireless sensor network.

Figure 3:
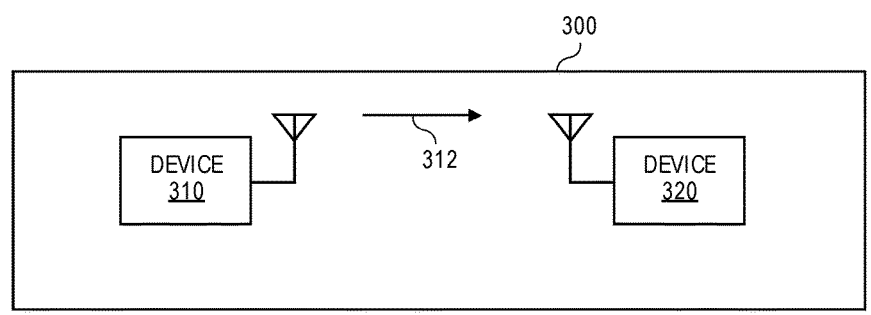
FIG. 3 illustrates a time of flight measurement system in accordance with one embodiment.

To determine the distance between two objects based on RF, ranging measurements are performed (i.e., RF communication is used to estimate the distance between the pair of objects). To achieve this, an RF signal is sent from one device to another. FIG. 3 illustrates a time of flight measurement system in accordance with one embodiment. A transmitting device 310 sends an RF signal 312, and a receiving device 320 receives the RF signal 312, as shown in FIG. 3. Here, in an exemplary wireless network, the device 310 may be a hub or a node, and the device 320 may also be a hub or a node.

Figure 4:
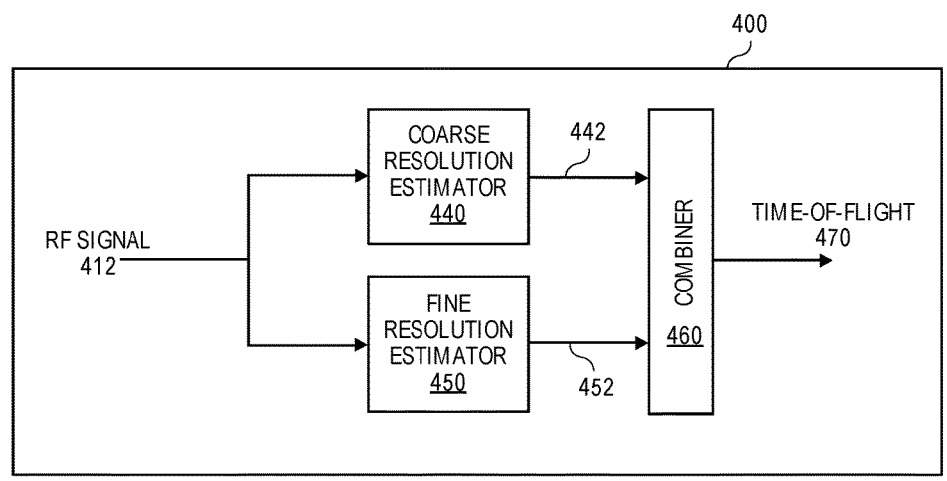
FIG. 4 illustrates a block diagram of a time of flight measurement system in accordance with one embodiment.

FIG. 4 illustrates a block diagram of a time of flight measurement system in accordance with one embodiment. A receiving device (e.g., device 320) receives the transmission from the transmitting device (e.g., device 310) and processes the RF signal 412 to generate at least one coarse estimation 442 using a coarse resolution estimator 440 and at least one fine estimation 452 of the propagation delay between the two devices over the air using a fine resolution estimator 450. The system 400 then utilizes a combiner 460 to combine the coarse time estimation 442 and the fine time estimation 452 to generate an accurate time-of-flight measurement 470. This time-of-flight measurement 470 can then be multiplied by the speed of light to calculate the distance, as shown in FIG. 4.

Figure 5:
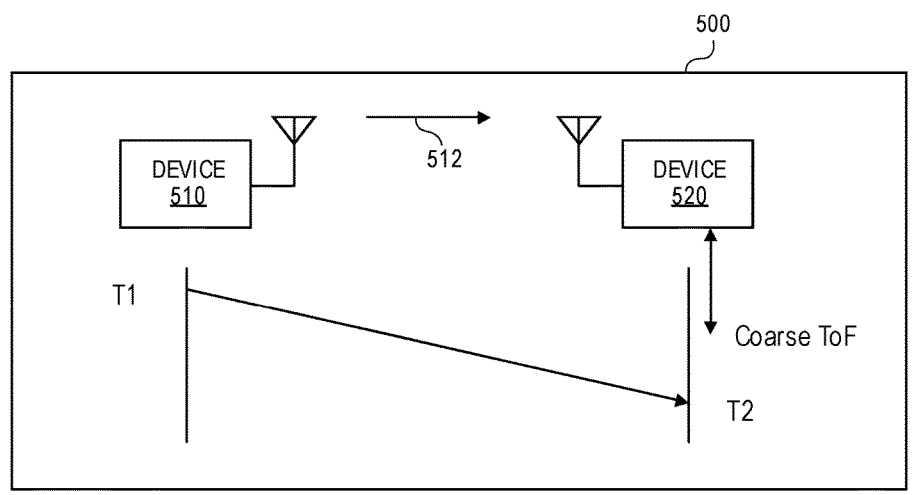
FIG. 5 illustrates a fully synchronous system that is used for distance estimation in accordance with one embodiment.
Figure 6:
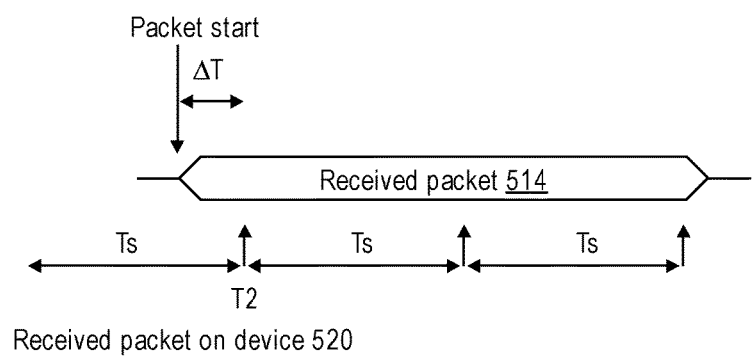
FIG. 6 illustrates how a packet of a recorded RF signal is a time-shifted version of a signal transmitted from device 510 in accordance with one embodiment.

Time of flight measurements are inherently sensitive to the timing of operations within the network, and therefore, the clocking of the devices performing the measurements is important. FIG. 5 illustrates a fully synchronous system that is used for distance estimation in accordance with one embodiment. In a fully synchronous system 500, i.e. both devices share the same clock reference, device 510 first sends a RF signal 512 (e.g., RF signal having a packet) to device 520 at time T1. The packet arrives at the device 520 at time T2 and triggers a packet detection algorithm in device 520 to register this time T2. Because it is a synchronous system, the coarse estimation of time of flight can be calculated as T2−T1. However, the resolution of this measurement is limited by the time resolution of the sampling clock, which will have a frequency of $f_s$ and a time resolution of Ts. The time resolution is illustrated in FIG. 6. Here, the sampling clock represents the maximum precision of time estimation of the system, and may, in an exemplary system, be set by the frequency of the clock used to control the circuitry used to detect the timing of transmission or reception. For example, if the sampling clock is 100 MHz, the resolution of this measurement will be at 10 nanoseconds (ns), which corresponds to roughly 10-foot accuracy.

In order to improve this accuracy, the RF signal 512 may be recorded and analyzed at device 520. FIG. 6 illustrates how a packet of a recorded RF signal is a time-shifted version of a signal transmitted from device 510 in accordance with one embodiment. At a sample clock time interval (Ts), a packet 514 of the RF signal 512 is detected at T2. The true beginning of the received packet 514 is a fraction period (e.g., $\Delta T$) of a sampling clock period earlier than T2.

Figure 7B:
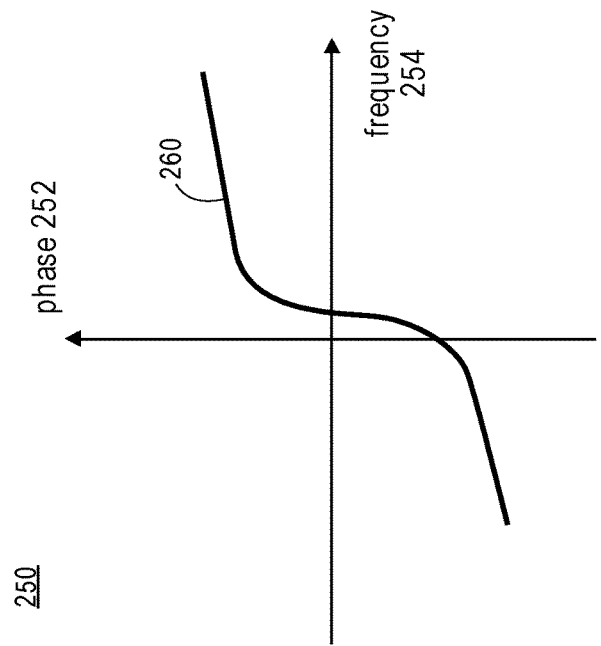
FIG. 7B illustrates a phase response of a non-ideal channel in accordance with one embodiment.
Figure 7A:
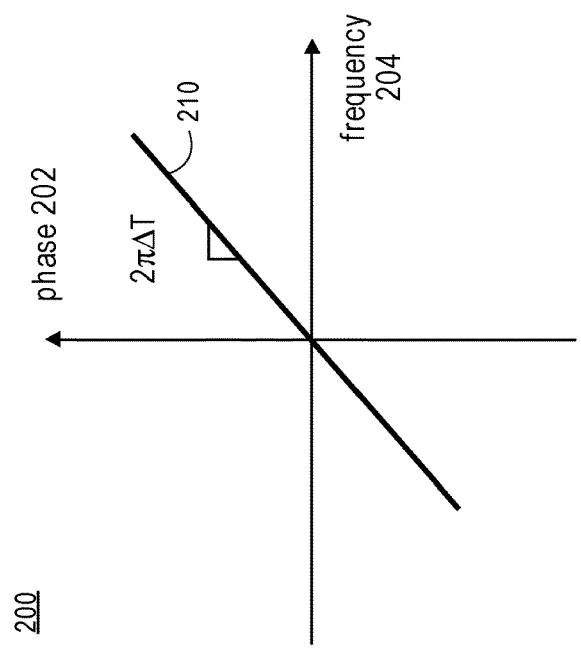
FIG. 7A illustrates a phase response of an ideal channel in accordance with one embodiment.

Multiple methods can be used to estimate this fractional period (e.g., $\Delta T$). For example, the time domain signal can be converted into frequency domain using a fast fourier transform (FFT), then divided by the spectrum of the original signal to obtain the frequency response of the channel. In an orthogonal frequency-division multiplexing (OFDM) based system, this information can also be obtained from channel sense information (CSI). In an ideal channel over the air, the channel response in frequency domain is $$H(f) = A e^{j2\pi f \Delta T}$$

Where A is the loss of the channel and $\Delta T$ is the delay of the channel. FIG. 7A illustrates a phase response of an ideal channel in accordance with one embodiment. A plot of phase 202 on a vertical axis and frequency 204 on a horizontal axis illustrates an ideal channel 210 as a straight line with a slope corresponding to $2\pi \ast \Delta T$.

Combining $\Delta T$ with T2−T1, an accurate distance estimation can be established as:

$$\text{Distance} = (T2 - T1 - \text{slope}/(2\pi)) \times C$$

where C is the speed of light.

In the case of non-ideal channels, there are multiple reflections from the environment and the overall channel response can be annotated as $$H(f) = \Sigma A_k e^{j2\pi f \Delta T_k}$$

where $A_k$ is the amplitude of each path, and $\Delta T_k$ is the delay of each path. As a result, the channel response will differ from a straight line in phase. FIG. 7B illustrates a phase response of a non-ideal channel in accordance with one embodiment. A plot of phase 252 on a vertical axis and frequency 254 on a horizontal axis illustrates a non-ideal channel 260.

Advanced algorithms like Matrix Pencil, MUSIC, etc. can be used to estimate the minimum delay of the multiple paths ($\Delta T_k$), and the distance can be calculated from this extracted minimum delay.

$$\text{Distance} = (T2 - T1 - S\{H(f)\}) \times C$$

where $S\{H(f)\}$ is the result of minimum delay extraction from the channel response measurement, i.e. it should be equal to $\min\{\Delta T_k\}$.

By separating the system into coarse and fine estimation, high efficiency and high performance can be achieved simultaneously. The coarse time estimator can cover long range, albeit with reduced accuracy. Such low accuracy requirements also make this estimator less sensitive to interference and multi-path, which is an important error source for time-of-flight measurements. There are multiple methods that can be used to determine the coarse time estimation. For example, the coarse time can be extracted from timestamps that indicate the time when the signal is transmitted and when the signal is received. Alternatively, a measurement of the phase of signals received at multiple carrier frequencies can be unwrapped using the Chinese Remainder Theorem to estimate the coarse delay. A non-uniform discrete Fourier transform using a particular set of non-uniform carrier frequencies can also be used to estimate the coarse delay.

On the other hand, the fine resolution estimator only needs to cover a relatively short range, therefore reducing the computing resources needed for the system. The fine estimation is only required to cover a maximum delay of one coarse sample period. Advanced algorithms can also be applied to this estimator to improve the performance with interference and multi-path environments. This fine estimate can also be derived using multiple methods. For example, it can be derived from cross correlation of the received signal with an ideal version of the signal. It can also be derived from channel estimation using the received signal. The channel estimate can be converted into a fine delay estimate by using the slope of the phase, inverse FFT, matrix pencil, MUSIC, or other methods.

In linear algebra, matrix pencil is defined as a matrix-valued function with a complex variable λ

$$L(\lambda) = \Sigma \lambda^i A_i$$

In the context of ranging measurement, the channel response has a similar format of $$H(f) = H(n \ast f\text{sub}) = \Sigma A_k e^{j2\pi f \Delta T_k} = \Sigma A_k (e^{j2\pi f\text{sub} \Delta T_k})^n = \Sigma A_k (\lambda)^n$$

where frequency domain measurement is performed at frequencies equally spaced by fsub (sub-carrier frequency).

The matrix-pencil method can therefore be used to extract the poles (λ) of such system. Once all possible poles ($\lambda_k$) are extracted from measurement, each time delay can be calculated as $$\Delta T_k = \log(\lambda_k)/(j2\pi f_{sub})$$

In another embodiment, a multiple signal classification (MUSIC) algorithm may be used. MUSIC is based on signal modeling consisting of a sum of harmonic signals $$X(n) = \Sigma A_k e^{j*w_k*n}$$

Similar to the case of Matrix-Pencil, the channel response can be written as $$H(f) = H(n*f_{sub}) = \Sigma A_k e^{j*2\pi f*\Delta Tk} = \Sigma A_k e^{j*2\pi*f_{sub}*\Delta Tk*n}$$

The algorithm then extracts $A_k$ and $w_k$ based on the measurement results X(n), and the delay elements can be calculated as $$\Delta T_k = w_k/(2\pi f_{sub}))$$

The channel estimate can also be combined with the coarse delay estimate before estimating the total path delays. The coarse delay can be added to the channel estimate as a linear phase shift. In the synchronous case it is:

$$T_{coarse} = \frac{1}{2}((T_4-T_1)-(T_3-T_2))$$

$$H_{tot}(f) = H(f)e^{-j2\pi f T_{coarse}}$$

In the case of an asynchronous system, the calculated clock phase offset is also applied as an addition or subtraction of a linear phase shift to the forward or reverse channel estimate.

$$H_{tot}(f)^2 = H(f)^2 e^{-j2\pi f 2 T_{coarse}}$$

Or $$H_{tot}(f) = H_{forw}(f)e^{-j2\pi f T_{coarse}} e^{j2\pi f T_{offset}}$$

Or $$H_{tot}(f) = H_{rev}(f)e^{-j2\pi f T_{coarse}} e^{-j2\pi f T_{offset}}$$

Then matrix pencil, MUSIC, or other methods can be applied to the coarse plus fine channel estimate. This allows all of the estimated paths to be real distances relative to 0 distance. This aids in the elimination of false short paths and the selection of the line of sight path.

If the nodes have synchronous clocks, then the channel estimate (with or without the coarse delay correction) can be averaged across multiple packets or multiple wireless transmissions. This averaging can be performed before using matrix pencil, MUSIC, or other methods for path estimation. Averaging of the channel estimate improves the signal to noise ratio (SNR) as long as the multiple channel estimates are measured quickly relative to changes in the channel (the channel coherence time). Higher SNR improves the accuracy of the path estimation and allows weaker paths to be distinguished from noise.

In an asynchronous system, the phase offset correction methods described above also allow averaging multiple channel estimates. When using the multiplication method the combined channel response $H(f)^2$ or $H_{tot}(f)^2$ can be averaged across multiple transmissions. When using the division method, $H_{tot}(f)$ can be averaged across multiple transmissions.

In the systems described herein, noise, numerical errors, and other such limitations may cause the wrong delay to be estimated. If longer-than the actual time delay is estimated, the time delay result will not be affected because only the shortest delay is used for distance-related delay calculation. On the other hand, if a shorter-than time of flight delay is estimated, it can be mistaken as the actual time of flight delay. Therefore, it is important to eliminate false short paths to improve the time delay estimation accuracy. Therefore, in one embodiment, a system to correct for this error is implemented.

In one embodiment, a system recognizes erroneous measurements for distance estimates between nodes and calculates or recalculates locations for the nodes without using the erroneous measurements for the distance estimates or by deemphasizing the erroneous measurements for the distance estimates.

In one example, at least one erroneous measurement for distance estimates can be excluded from use for location estimates based on an error metric of error metric information being greater than an error threshold. Error metric information can be determined based on a difference between the measured distance estimates (e.g., time of flight information) and calculated distance estimates between nodes from locations and location estimates using triangulation.

Error metrics for distance estimates between nodes can be weighted with weighting factors that can correlate with quality of distance measurements (e.g., RSSI, quality of fit between channel response generated from estimated poles and measured response, amplitude of estimate line of sight signal, etc.).

In a wireless environment, the amplitude of the signal decreases with distances quadratically as described by free-space-path-loss. Therefore, the shorter path estimated from the delay-estimation algorithm is expected to have a higher amplitude. This foreknowledge is then used to eliminate false short path estimates. The amplitude of the received signals can be normalized by multiplying the square of the estimated distance by the estimated amplitude. If this normalized amplitude is lower than a certain threshold, it is an indication that the estimation of this path is due to either noise or algorithm limitations, and therefore can be eliminated.

In practice, the actual signal strength also depends on the additional loss incurred on the path, including walls, windows, reflections, and etc. A threshold can be set according to the expected loss due to these factors, or can be set according to empirical data.

Once distances between the various pairs on the networks are established, the information can be passed to one or more members of the network or even to systems outside the network for estimation of relative and/or absolute locations of the various members of the network. This can be performed using a variety of techniques. For example, triangulation approaches may be used as are well known to those of skill in the art. Error minimization techniques such as least squares approaches may be used to improve accuracy and reduce errors of position estimation. Such approaches may be used to reduce any errors associated with distance estimation in the embodiments described herein by taking advantage of the redundant information produced in the various paired distance estimates. Other techniques that may be used to perform localization based on the determined ranging data include multi-dimensional scaling, self-positioning algorithm, terrain algorithm, collaborative multilateration, distributed maximum likelihood, hyperbolic position fix, mobile geographic distributed localization, elastic localization algorithm, and other such anchor-free and anchor-based localization algorithms.

The localization information determined herein may be used to facilitate or improve the operation of a wireless sensor network. An exemplary wireless sensor network is disclosed in U.S. patent application Ser. No. 14/925,889 filed on Aug. 19, 2015, which is incorporated by reference herein. The localization may be used to establish logical and/or functional relationships within the network. In one exemplary embodiment, localization information may be used to define constellation membership in a sensor network that allows node-to-node communication with a constellation of a normally tree-like network, such as shown in FIG. 2. In this embodiment, localization is used to identify nodes that should be assigned to be within the same constellation. These may then communicate directly with each other without going through the hub. An advantage of this approach is that errors in distance estimate that survive triangulation calculations will not cause catastrophic failure of the network; rather, at most, these errors will cause erroneous assignment of constellations. Use of overlapping constellation assignments or loose constellation assignment rules may further be used to prevent this from impacting network performance in an undesirable manner.

In one embodiment, a Location Algorithm includes anchor-based Triangulation. In an anchor-based system, the location of anchor nodes (e.g., hubs, sensors, devices, etc.) is known. The unknown location of other devices is calculated based on the known location of the anchors as well as the measured distance (e.g., distance estimates) between each device and each anchor. The location of these unknown devices is calculated one by one with the same procedure. For each of the devices, the distance measurement with anchor i is:

$$d_i = \sqrt{(x-x_i)^2 + (y-y_i)^2 + (z-z_i)^2} + n_i$$

where $x_i$, $y_i$, and $z_i$ are the coordinates of the ith anchor; $d_i$ is the measured distance between the unknown device and the ith anchor; x, y, and z are the coordinates of the unknown device, which is the goal of the estimation, and $n_i$ is an error. By setting up different error functions for the estimation, one can use linear least squares to calculate the location of the unknown device (x,y,z).

If at least one distance measurement from the anchor nodes have some error, then the calculated locations for devices with unknown locations may not be accurate. In this example, the wireless system can measure some fraction of the node to node distances and use these measured distance to refine the locations calculated using the anchor node to node measurements. Using this approach, metrics for errors in individual distance measurements can also be found and tabulated.

Distances estimates having an error metric greater than an error threshold can be excluded to improve location estimates with the Location Algorithm.

Initial location estimates of the Location Algorithm can be also compared to any known map of the environment in which the nodes are physically located to form the wireless network architecture. If the map indicates any disadvantaged node to node or node to anchor pairs, then these pairs can be excludes or given a reduced emphasis for the Location Algorithm. Disadvantages could include walls, large objects, and interference etc. The map information can also be used to identify impossible locations, or force particular node topography (e.g., node can only be located on walls, node can only be located away from walls, etc).

In another embodiment, for an Anchor-less Triangulation setup, there is no known location for any of the devices. The algorithm has to use the distance measurement between pairs of the devices to determine the relative location of each device. The goal is to find out the relative location of all devices to minimize the overall error of the distance measurement. There are multiple types of algorithms including an incremental algorithm and a concurrent algorithm. An incremental algorithm starts with a small set of devices and calculates their locations based on distance measurement. The small set of device is then used as anchor nodes for other devices. It is a simple algorithm but with the drawback that the error in early calculated nodes can be easily propagated to the later nodes, even with an advanced algorithm which updates location of the early nodes.

A concurrent algorithm solves the issue of the incremental algorithm due to the concurrent algorithm estimating all locations at the same time to achieve a global optimum with lower error than incremental algorithm. It usually uses iterative process to update the location of the devices, therefore it will take longer time to converge while using more computation power and memory.

Figure 8A:
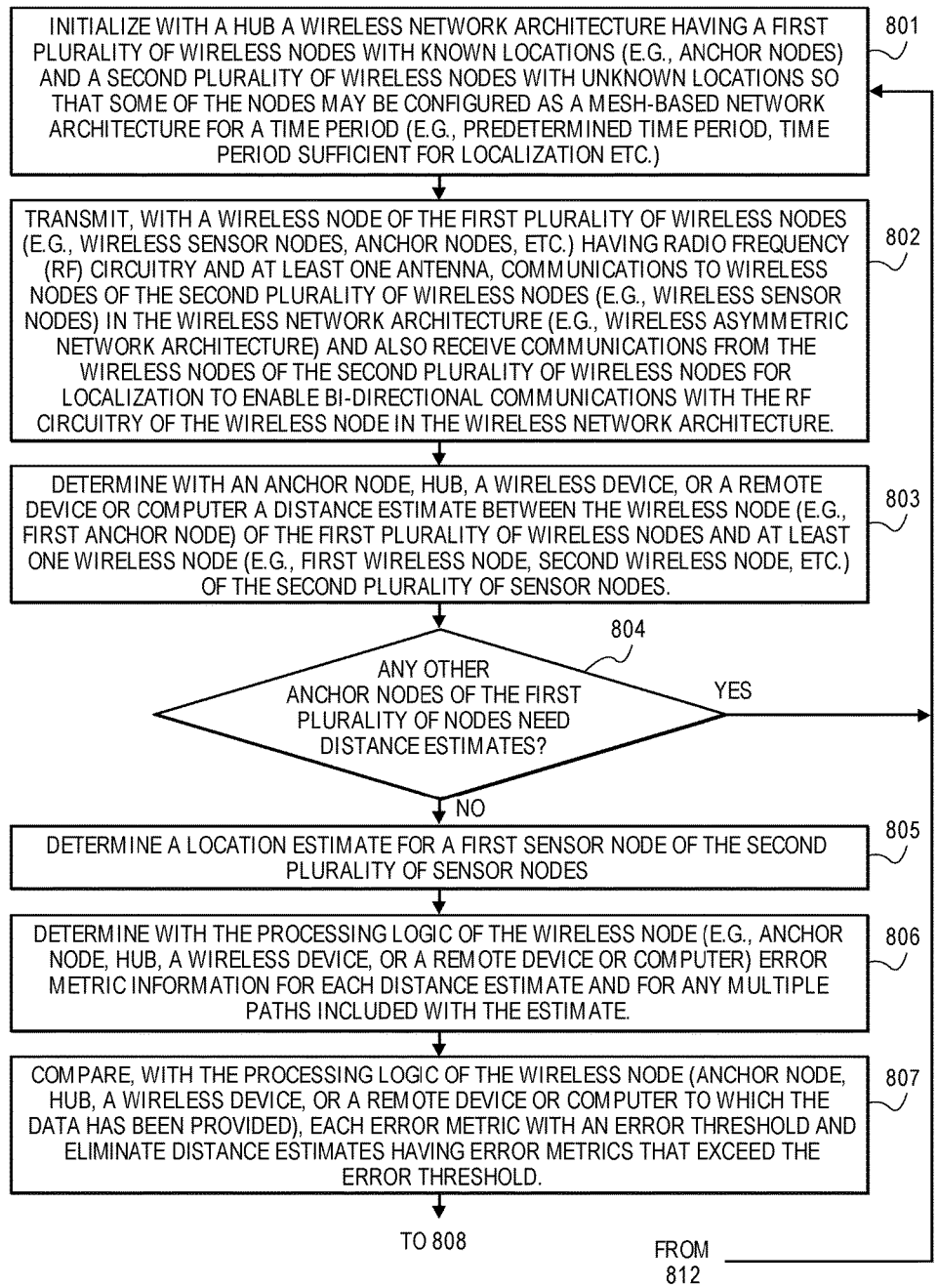

FIGS. 8A, 8B, and 8C illustrate a localizing method for determining location estimation of nodes by adaptively selecting distance estimates of nodes based on error metric information in accordance with one embodiment. The operations of method 800 may be executed by a wireless device, a wireless control device of a hub (e.g., an apparatus), or system, which includes processing circuitry or processing logic. The processing logic may include hardware (circuitry, dedicated logic, etc.), software (such as is run on a general purpose computer system or a dedicated machine or a device), or a combination of both. In one embodiment, an anchor node, hub, a wireless device, or a remote device or computer performs the operations of method 800. Algorithms associated with the various computations may be performed in a remote computer to which the relevant data associated with distance measurements is sent. The remote device or computer may be at a different location than the wireless network architecture having a plurality of wireless nodes. The remote device or computer may be at a different location within the wireless network architecture than certain nodes that are transmitted and receiving communications within the wireless network architecture.

A wireless network architecture having a first plurality of wireless nodes with known locations (e.g., anchor nodes) and a second plurality of wireless nodes with unknown locations is initialized by a hub at operation 801 so that some of the nodes may be configured as a mesh-based network architecture for a time period (e.g., predetermined time period, time period sufficient for localization etc.).

At operation 802, a wireless node of the first plurality of wireless nodes (e.g., anchor nodes, etc.) having radio frequency (RF) circuitry and at least one antenna transmits communications to wireless nodes of the second plurality of wireless nodes (e.g., wireless sensor nodes) in the wireless network architecture (e.g., wireless asymmetric network architecture) and also receives communications from the wireless nodes of the second plurality of wireless nodes for localization to enable bi-directional communications with the RF circuitry of the wireless node in the wireless network architecture. At operation 803, an anchor node, hub, a wireless device, or a remote device or computer determines a distance estimate between the wireless node (e.g., first anchor node) of the first plurality of wireless nodes and at least one wireless node (e.g., first wireless node, second wireless node, etc.) of the second plurality of sensor nodes In one example, operation 803 determines distance estimates between the wireless node of the first plurality of wireless nodes (e.g., first anchor node) and the second plurality of sensor nodes.

At operation 804, an anchor node, hub, a wireless device, or a remote device or computer determines whether any other anchor nodes of the first plurality of nodes need distance estimates. If not, the method proceeds to operation 805. If so, the method proceeds to perform operations 801-803 for any additional anchor nodes of the first plurality of wireless sensor nodes and at least one wireless node of the second plurality of wireless nodes. In one example, operation 803 determines distance estimates between a second anchor node and the second plurality of sensor nodes. In another example, operation 803 determines distance estimates between a third anchor node and the second plurality of sensor nodes.

The distance estimates between a first plurality of wireless sensor nodes having known locations and a second plurality of wireless sensor nodes having unknown locations may include multiple paths. The multiple paths can be included for at least one distance estimate or for all distance estimates. In one example, the estimated shortest path distance (e.g., line of sight distance, direct path distance, direct distance) as well as other path distances calculated with ranging algorithm for distance estimates are included in a location algorithm for localization. A potential location for each path is calculated \. Upon distance estimates completing for a certain threshold of anchor nodes (or all anchor nodes), the method proceeds to determine a location estimate for a first sensor node of the second plurality of sensor nodes at operation 805.

At operation 806, the processing logic of the wireless node (e.g., anchor node, hub, a wireless device, or a remote device or computer) determines error metric information for each distance estimate and for any multiple paths included with the estimate.

In one embodiment, the error metric information includes an error metric that is determined based on a difference between a distance estimate for a first node with a known location and a second node with an unknown location and a calculated distance between the first and second nodes that is based on triangulation.

At operation 807, the processing logic of the wireless node (anchor node, hub, a wireless device, or a remote device or computer to which the data has been provided) compares each error metric with an error threshold and eliminates distance estimates having error metrics that exceed the error threshold. In one embodiment, the error threshold is predefined based on an environment, distance measurements, an optimization procedure, or adaptively defined during the localization. In one example, distance estimates having largest error metrics are eliminated.

At operation 808, the processing logic of the wireless node, some other node on the network, or of a remote computer adaptively selects a subset of the distance estimates for localization (e.g., localization of the first sensor node) based on the error metric information. In one example, the processing logic adaptively selects a subset of the distance estimates for localization based on error metrics that are less than or equal to the error threshold. In this example, distances estimates and associated error metrics that are greater than the error threshold are not selected for determining localization.

In another example, the processing logic of the wireless node, of another node on the network, or of a remote computer adaptively applies additional weighting factors to the error metrics to deemphasize distance estimates having lower quality of distance measurements (based on e.g., RSSI, quality of fit between channel response generated from estimated poles and measured response, amplitude of estimate line of sight signal).

At operation 810, the processing logic of the wireless node, of another node on the network, or of a remote computer determines location information (e.g., location estimate) for the first wireless node of the second plurality of wireless sensor nodes a second time based on the adaptively selected distance estimates. In one example, the processing logic of the wireless node determines location estimates for localization based on a subset of the determined distance estimates with at least one distance estimate and associated wireless sensor node having a known location being excluded for determining the location estimates.

At operation 812, the processing logic of the wireless node, of another node on the network, or of a remote computer determines whether location information for any additional sensor nodes (e.g., second sensor node, third sensor) needs to be calculated. If not, the method proceeds to operation 814. If so, the method returns to operation 801 and repeats operations 801-810 (or a subset of operations 801-810) until location estimates for each sensor node of the second plurality of sensor nodes has been completed.

In one example, the processing logic of the wireless node, of another node on the network, or of a remote computer repeats the determining of the location information for the wireless nodes (e.g., second plurality of wireless sensor nodes) at least once with at least one distance estimate being excluded. Optionally, at least one wireless sensor node having a known location is also excluded.

At operation 814, the processing logic of the wireless node, of another node on the network, or of a remote computer provide instructions for ranging to a first sensor node of the second plurality of sensor nodes. At operation 815, the processing logic of the wireless node, of another node on the network, or of a remote computer provide instructions for ranging to a second sensor node of the second plurality of sensor nodes. At operation 816, the first and second sensor nodes of the second plurality of sensor nodes transmit and receive communications (e.g., bi-directional signaling) for ranging purposes. At operation 817, the processing logic of the wireless node, of another node on the network, or of a remote computer determine a distance estimate between the first and second sensor nodes based on the bi-directional signaling and location information.

At operation 818, the processing logic of the wireless node, of another node on the network, or of a remote computer determines if any additional sensor nodes need a distance estimate. If so, the method repeats the operations 814-817 for additional sensor nodes (e.g., third sensor node, fourth sensor node) of the second plurality of sensor nodes. If not, the method proceeds to operation 820.

At operation 820, the processing logic of the wireless node, of another node on the network, or of a remote computer determine a location estimate for the first sensor node of the second plurality of sensor nodes by using estimates from anchor nodes and other nodes assuming other node locations are previously determined during method 800.

At operation 821, the processing logic of the wireless node, of another node on the network, or of a remote computer determines error metric information for sensor to sensor distance estimates.

At operation 822, the processing logic of the wireless node (anchor node, hub, a wireless device, or a remote device or computer to which the data has been provided)

compares each error metric with an error threshold and eliminates distance estimates having error metrics that exceed the error threshold. In one embodiment, the error threshold is predefined based on an environment, distance measurements, an optimization procedure, or adaptively defined during the localization. In one example, distance estimates having largest error metrics are eliminated.

At operation 823, the processing logic of the wireless node, some other node on the network, or of a remote computer adaptively selects a subset of the distance estimates for localization (e.g., localization of the first sensor node) based on the error metric information. In one example, the processing logic adaptively selects a subset of the distance estimates for localization based on error metrics that are less than or equal to the error threshold. In this example, distances estimates and associated error metrics that are greater than the error threshold are not selected for determining localization.

In another example, the processing logic of the wireless node, of another node on the network, or of a remote computer adaptively applies additional weighting factors to the error metrics to deemphasize distance estimates having lower quality of distance measurements (based on e.g., RSSI, quality of fit between channel response generated from estimated poles and measured response, amplitude of estimate line of sight signal).

At operation 824, the processing logic of the wireless node, of another node on the network, or of a remote computer determines location information (e.g., location estimate) for the first wireless node of the second plurality of wireless sensor nodes a second time based on the adaptively selected distance estimates. In one example, the processing logic of the wireless node determines location estimates for localization based on a subset of the determined distance estimates with at least one distance estimate and associated wireless sensor node having a known location being excluded for determining the location estimates.

At operation 825, the processing logic of the wireless node, of another node on the network, or of a remote computer determines whether location information for any additional sensor nodes (e.g., second sensor node, third sensor) needs to be calculated. If so, the method returns to operation 814 and repeats operation 814 and subsequent operations until location estimates for each sensor node of the second plurality of sensor nodes has been completed.

If not, then the method proceeds to operation 826 to determine whether the location information for a sensor node (e.g., first sensor node) of the second plurality of sensor nodes is acceptable. If acceptable, then the method completes. If not acceptable, then the method returns to operation 814 and repeats operation 814 and subsequent operations until achieving acceptable locationing information for the sensor node at operation 826. Locationing information for other sensor nodes can be verified as well to be acceptable.

At operation 828, the processing logic of the wireless node, of another node on the network, or of a remote computer configures the wireless network in a tree based or tree-like network architecture (or tree architecture with no mesh-based features) upon completion of localization.

Figure 9A:
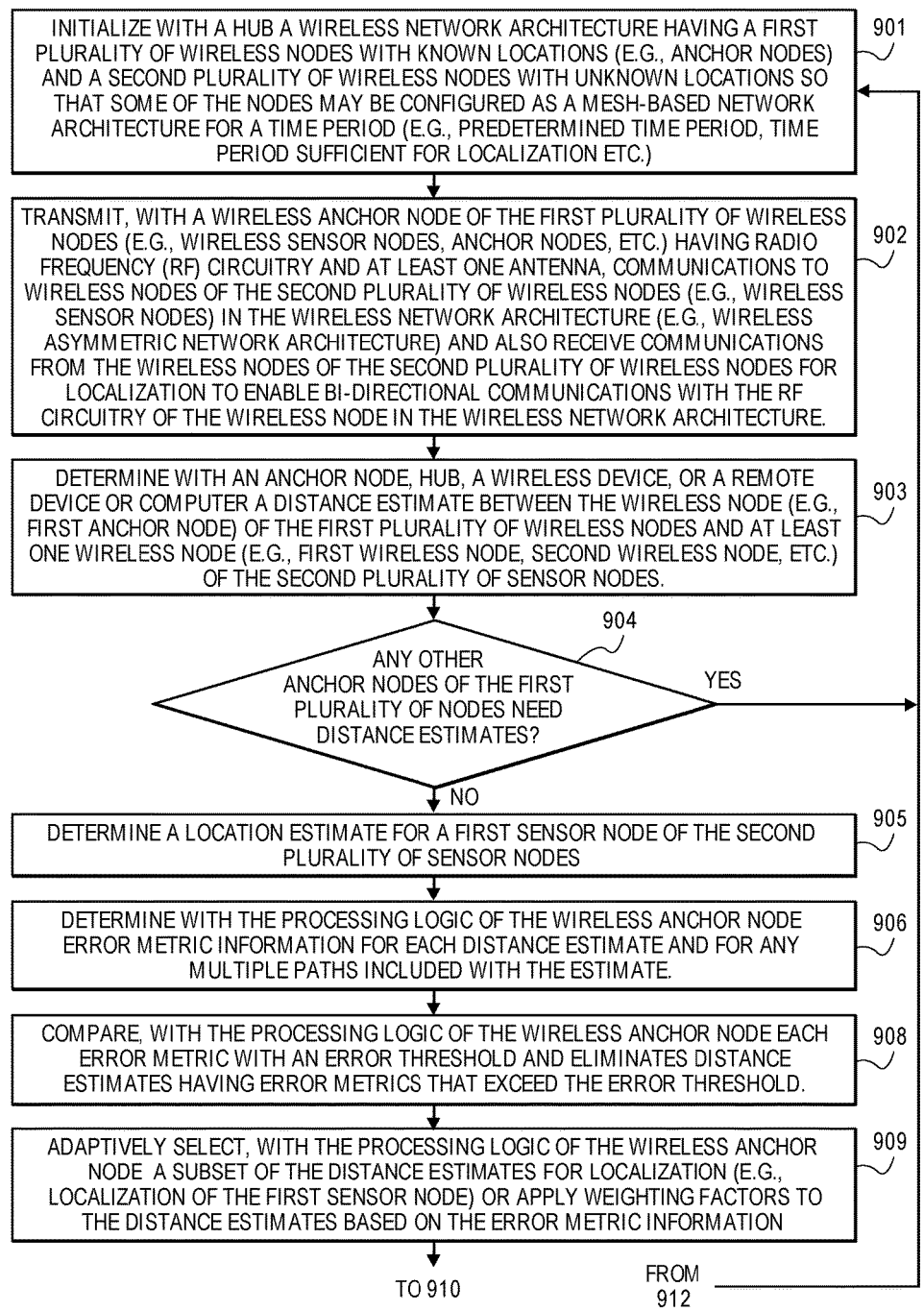

FIGS. 9A, 9B, and 9C illustrate a localizing method for determining location estimation of nodes by adaptively selecting distance estimates of nodes based on error metric information in accordance with another embodiment. The operations of method 900 may be executed by a wireless device, a wireless control device of a hub (e.g., an apparatus), or system, which includes processing circuitry or processing logic. The method may also be executed to make use of a remote computer or device or some other node on the network.

In one embodiment, an anchor node, hub, a wireless device, or a remote device or computer performs the operations of method 900. Algorithms associated with the various computations may be performed in a remote computer to which the relevant data associated with distance measurements is sent. The remote device or computer may be at a different location than the wireless network architecture having a plurality of wireless nodes. The remote device or computer may be at a different location within the wireless network architecture than certain nodes that are transmitted and receiving communications within the wireless network architecture.

The processing logic may include hardware (circuitry, dedicated logic, etc.), software (such as is run on a general purpose computer system or a dedicated machine or a device), or a combination of both. In one embodiment, an anchor node, hub, or a wireless device performs the operations of method 900.

A wireless network architecture having a first plurality of wireless nodes with known locations (e.g., anchor nodes) and a second plurality of wireless nodes with unknown locations is initialized by a hub at operation 901 so that some of the nodes may be configured as a mesh-based network architecture for a time period (e.g., predetermined time period, time period sufficient for localization etc.).

At operation 902, a wireless anchor node of the first plurality of wireless nodes (e.g., wireless sensor nodes, anchor nodes, a hub, etc.) having radio frequency (RF) circuitry and at least one antenna transmits communications to wireless nodes of the second plurality of wireless nodes (e.g., wireless sensor nodes) in the wireless network architecture (e.g., wireless asymmetric network architecture) and also receives communications from the wireless nodes of the second plurality of wireless nodes for localization to enable bi-directional communications with the RF circuitry of the wireless node in the wireless network architecture. At operation 903, an anchor node, hub, a wireless device, or a remote device or computer determines a distance estimate between the wireless node (e.g., first anchor node) of the first plurality of wireless nodes and at least one wireless node (e.g., first wireless node, second wireless node, etc.) of the second plurality of sensor nodes In one example, operation 803 determines distance estimates between the wireless node of the first plurality of wireless nodes (e.g., first anchor node) and the second plurality of sensor nodes.

At operation 904, an anchor node, hub, a wireless device, or a remote device or computer determines whether any other anchor nodes of the first plurality of nodes need distance estimates. If not, the method proceeds to operation 9905. If so, the method proceeds to perform operations 901-903 for any additional anchor nodes of the first plurality of wireless sensor nodes and at least one wireless node of the second plurality of wireless nodes. In one example, operation 903 determines distance estimates between a second anchor node and the second plurality of sensor nodes. In another example, operation 903 determines distance estimates between a third anchor node and the second plurality of sensor nodes.

The distance estimates between a first plurality of wireless sensor nodes having known locations and a second plurality of wireless sensor nodes having unknown locations may include multiple paths. The multiple paths can be included for at least one distance estimate or for all distance estimates. In one example, the estimated shortest path distance (e.g., line of sight distance, direct path distance, direct distance) distance as well as other path distances calculated with ranging algorithm for distance estimates are included in a location algorithm for localization. A potential location for each path is calculated. Upon distance estimates completing for a certain threshold of anchor nodes (or all anchor nodes), the method proceeds to determine a location estimate for a first sensor node of the second plurality of sensor nodes at operation 805.

At operation 906, the processing logic of the wireless anchor node determines error metric information for each distance estimate and for any multiple paths included with the estimate.

In one embodiment, the error metric information includes an error metric that is determined based on a difference between a distance estimate for a first node with a known location and a second node with an unknown location and a calculated distance between the first and second nodes that is based on triangulation.

In another embodiment, the error metrics are determined based on location estimates of the location information and prior knowledge of an environment of the wireless network architecture such that any disadvantaged distance estimates are excluded or an associated error metric of a disadvantaged distance estimate is adjusted with a higher error metric.

In another embodiment, the error metrics are determined based on a received quality of signal including signal strength of communication (RSSI) or ranging measurement signals.

At operation 908, the processing logic of the wireless anchor node compares each error metric with an error threshold and eliminates distance estimates having error metrics that exceed the error threshold. In one embodiment, the error threshold is predefined based on an environment, distance measurements, an optimization procedure, or adaptively defined during the localization. In one example, distance estimates having largest error metrics are eliminated.

At operation 909, the processing logic of the wireless anchor node adaptively selects a subset of the distance estimates for localization (e.g., localization of the first sensor node) or applies weighting factors to the distance estimates based on the error metric information. In one example, the processing logic adaptively selects a subset of the distance estimates for localization based on error metrics that are less than or equal to the error threshold. In this example, distances estimates and associated error metrics that are greater than the error threshold are not selected for determining localization.

In another example, the processing logic of the wireless node adaptively applies weighting factors to the determined distance estimates for localization based on the error metrics to deemphasize distance estimates having error metrics that exceed an error threshold.

At operation 910, the processing logic of the wireless anchor node determines location information (e.g., location estimate) for the first wireless node of the (e.g., second plurality of wireless sensor nodes) a second time based on the adaptively selected distance estimates. In one example, the processing logic of the wireless node determines location estimates for localization based on a subset of the determined distance estimates with at least one distance estimate and associated wireless sensor node having a known location being excluded for determining the location estimates.

At operation 912, the processing logic of the wireless anchor node determines whether location information for any additional sensor nodes (e.g., second sensor node, third sensor) needs to be calculated. If not, the method proceeds to operation 914. If so, the method returns to operation 901 and repeats operations 901-910 (or a subset of operations 901-910) until location estimates for each sensor node of the second plurality of sensor nodes have been completed.

In another example, the processing logic of the wireless anchor node determines location estimates for localization based on applying weighting factors to the determined distance estimates for localization to deemphasize distance estimates having error metrics that exceed an error threshold.

In one example, the processing logic of the wireless anchor node repeats the determining of the location information for the wireless nodes (e.g., second plurality of wireless sensor nodes) at least once with at least one distance estimate being excluded. Optionally, at least one wireless sensor node having a known location is also excluded. The distance estimates having lowest error metrics (e.g., error metrics below an error threshold, error metrics significantly below an error threshold) can be used to determine location information for the wireless nodes. Alternatively, at least one distance estimate and associated wireless sensor node having a known location are assigned a modified influence due to the error metric information.

In one example, the processing logic of the wireless nodes determines localization repeatedly for at least one wireless sensor node based on initial node location estimates, the distance estimates and associated error metrics, and locations of the first plurality of the wireless sensor nodes.

At operation 914, the processing logic of the wireless node, of another node on the network, or of a remote computer provide instructions for ranging to a first sensor node of the second plurality of sensor nodes. At operation 915, the processing logic of the wireless node, of another node on the network, or of a remote computer provide instructions for ranging to a second sensor node of the second plurality of sensor nodes. At operation 916, the first and second sensor nodes of the second plurality of sensor nodes transmit and receive communications (e.g., bi-directional signaling) for ranging purposes. At operation 917, the processing logic of the wireless node, of another node on the network, or of a remote computer determine a distance estimate between the first and second sensor nodes based on the bi-directional signaling and location information.

At operation 918, the processing logic of the wireless node, of another node on the network, or of a remote computer provide repeats the operations 914-917 for additional sensor nodes (e.g., third sensor node, fourth sensor node) of the second plurality of sensor nodes.

At operation 920, the processing logic of the wireless node, of another node on the network, or of a remote computer determine a location estimate for the first sensor node of the second plurality of sensor nodes by using estimates from anchor nodes and other nodes assuming other node locations are previously determined during method 900.

At operation 921, the processing logic of the wireless node, of another node on the network, or of a remote computer determine error metric information for sensor to sensor distance estimates.

At operation 922, the processing logic of the wireless node (anchor node, hub, a wireless device, or a remote device or computer to which the data has been provided) compares each error metric with an error threshold and eliminates distance estimates having error metrics that exceed the error threshold. In one embodiment, the error threshold is predefined based on an environment, distance measurements, an optimization procedure, or adaptively defined during the localization. In one example, distance estimates having largest error metrics are eliminated.

At operation 923, the processing logic of the wireless node, some other node on the network, or of a remote computer adaptively selects a subset of the distance estimates for localization (e.g., localization of the first sensor node) based on the error metric information. In one example, the processing logic adaptively selects a subset of the distance estimates for localization based on error metrics that are less than or equal to the error threshold. In this example, distances estimates and associated error metrics that are greater than the error threshold are not selected for determining localization.

In another example, the processing logic of the wireless node, of another node on the network, or of a remote computer adaptively applies additional weighting factors to the error metrics to deemphasize distance estimates having lower quality of distance measurements (based on e.g., RSSI, quality of fit between channel response generated from estimated poles and measured response, amplitude of estimate line of sight signal).

At operation 924, the processing logic of the wireless node, of another node on the network, or of a remote computer determines location information (e.g., location estimate) for the first wireless node of the second plurality of wireless sensor nodes a second time based on the adaptively selected distance estimates. In one example, the processing logic of the wireless node determines location estimates for localization based on a subset of the determined distance estimates with at least one distance estimate and associated wireless sensor node having a known location being excluded for determining the location estimates.

At operation 925, the processing logic of the wireless node, of another node on the network, or of a remote computer determines whether location information for any additional sensor nodes (e.g., second sensor node, third sensor) needs to be calculated. If so, the method returns to operation 914 and repeats operation 914 and subsequent operations until location estimates for each sensor node of the second plurality of sensor nodes has been completed.

If not, then the method proceeds to operation 926 to determine whether the location information for the first sensor node of the second plurality of sensor nodes is acceptable. If acceptable, then the method completes. If not acceptable, then the method returns to operation 914 and repeats operation 914 and subsequent operations until achieving acceptable locationing information for the first sensor node at operation 926. Locationing information for other sensor nodes can be verified as well to be acceptable.

At operation 928, the processing logic of the wireless node configures the wireless network in a tree based or tree-like network architecture (or tree architecture with no mesh-based features) upon completion of localization.

The communication between hubs and nodes as discussed herein may be achieved using a variety of means, including but not limited to direct wireless communication using radio frequencies, Powerline communication achieved by modulating signals onto the electrical wiring within the house, apartment, commercial building, etc., WiFi communication using such standard WiFi communication protocols as 802.11a, 802.11b, 802.11n, 802.11ac, and other such Wifi Communication protocols as would be apparent to one of ordinary skill in the art, cellular communication such as GPRS, EDGE, 3G, HSPDA, LTE, and other cellular communication protocols as would be apparent to one of ordinary skill in the art, Bluetooth communication, communication using well-known wireless sensor network protocols such as Zigbee, and other wire-based or wireless communication schemes as would be apparent to one of ordinary skill in the art.

The implementation of the radio-frequency communication between the terminal nodes and the hubs may be implemented in a variety of ways including narrow-band, channel overlapping, channel stepping, multi-channel wide band, and ultra-wide band communications.

The hubs may be physically implemented in numerous ways in accordance with embodiments of the invention. FIG. 10A shows an exemplary embodiment of a hub implemented as an overlay 1500 for an electrical power outlet in accordance with one embodiment. The overlay 1500 (e.g., faceplate) includes a hub 1510 and a connection 1512 (e.g., communication link, signal line, electrical connection, etc.) that couples the hub to the electrical outlet 1502. Alternatively (or additionally), the hub is coupled to outlet 1504. The overlay 1500 covers or encloses the electrical outlets 1502 and 1504 for safety and aesthetic purposes.

FIG. 10B shows an exemplary embodiment of an exploded view of a block diagram of a hub 1520 implemented as an overlay for an electrical power outlet in accordance with one embodiment. The hub 1520 includes a power supply rectifier 1530 that converts alternating current (AC), which periodically reverses direction, to direct current (DC) which flows in only one direction. The power supply rectifier 1530 receives AC from the outlet 1502 via connection 1512 (e.g., communication link, signal line, electrical connection, etc.) and converts the AC into DC for supplying power to a controller circuit 1540 via a connection 1532 (e.g., communication link, signal line, electrical connection, etc.) and for supplying power to RF circuitry 1550 via a connection 1534 (e.g., communication link, signal line, electrical connection, etc.). The controller circuit 1540 includes memory 1542 or is coupled to memory that stores instructions which are executed by processing logic 1544 (e.g., one or more processing units) of the controller circuit 1540 for controlling operations of the hub for forming, monitoring, and performing localization of the wireless asymmetrical network as discussed herein. The RF circuitry 1550 may include a transceiver or separate transmitter 1554 and receiver 1556 functionality for sending and receiving bi-directional communications via antenna(s) 1552 with the wireless sensor nodes. The RF circuitry 1550 communicates bi-directionally with the controller circuit 1540 via a connection 1534 (e.g., communication link, signal line, electrical connection, etc.). The hub 1520 can be a wireless control device 1520 or the controller circuit 1540, RF circuitry 1550, and antenna(s) 1552 in combination may form the wireless control device as discussed herein.

Figure 11B:
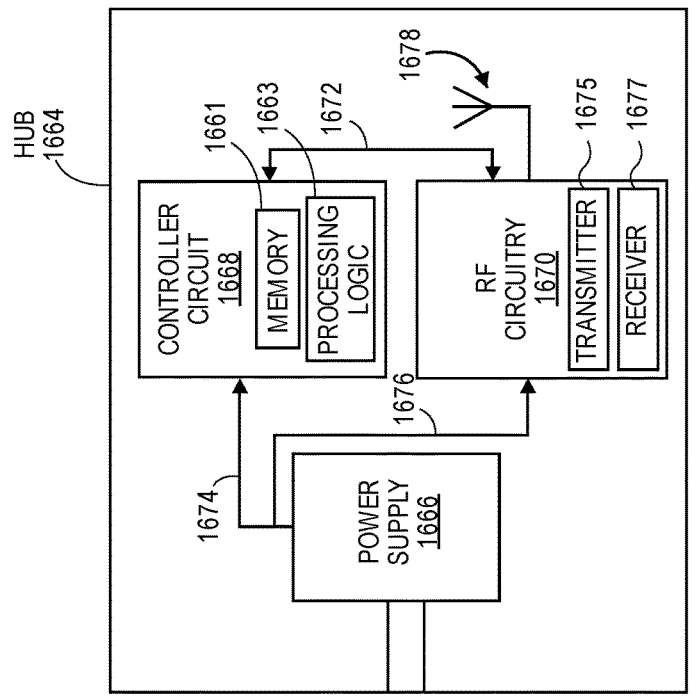
FIG. 11B shows an exemplary embodiment of a block diagram of a hub 964 implemented as a card for deployment in a computer system, appliance, or communication hub in accordance with one embodiment.
Figure 11A:
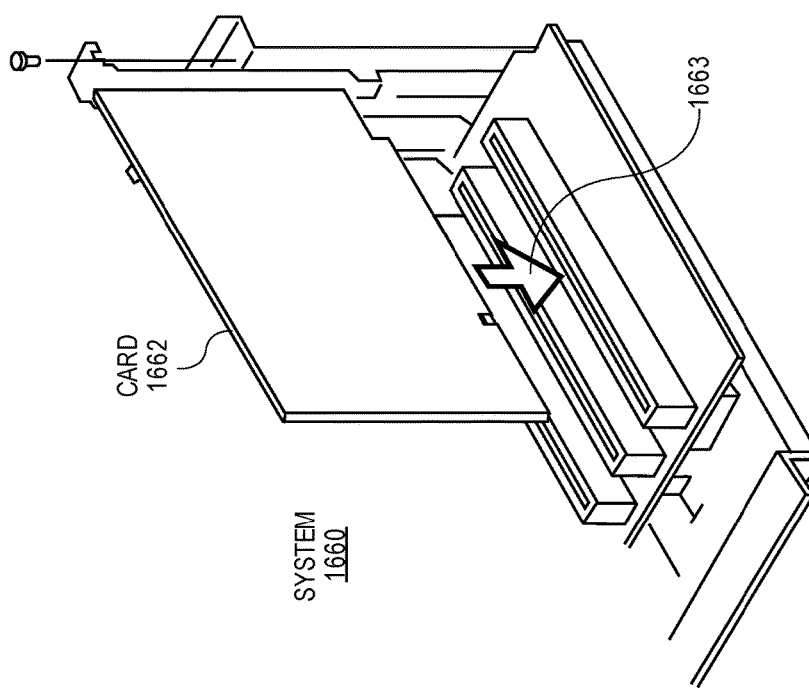
FIG. 11A shows an exemplary embodiment of a hub implemented as a card for deployment in a computer system, appliance, or communication hub in accordance with one embodiment.

FIG. 11A shows an exemplary embodiment of a hub implemented as a card for deployment in a computer system, appliance, or communication hub in accordance with one embodiment. The card 1662 can be inserted into the system 1660 (e.g., computer system, appliance, or communication hub) as indicated by arrow 1663.

FIG. 11B shows an exemplary embodiment of a block diagram of a hub 1664 implemented as a card for deployment in a computer system, appliance, or communication hub in accordance with one embodiment. The hub 1664 includes a power supply 1666 that provides power (e.g., DC power supply) to a controller circuit 1668 via a connection 1674 (e.g., communication link, signal line, electrical connection, etc.) and provides power to RF circuitry 1670 via a connection 1676 (e.g., communication link, signal line, electrical connection, etc.). The controller circuit 1668 includes memory 1661 or is coupled to memory that stores instructions which are executed by processing logic 1663 (e.g., one or more processing units) of the controller circuit 1668 for controlling operations of the hub for forming, monitoring, and performing localization of the wireless asymmetrical network as discussed herein. The RF circuitry 1670 may include a transceiver or separate transmitter 1675 and receiver 1677 functionality for sending and receiving bi-directional communications via antenna(s) 1678 with the wireless sensor nodes. The RF circuitry 1670 communicates bi-directionally with the controller circuit 1668 via a connection 1672 (e.g., communication link, signal line, electrical connection, etc.). The hub 1664 can be a wireless control device 1664 or the controller circuit 1668, RF circuitry 1670, and antenna(s) 1678 in combination may form the wireless control device as discussed herein.

FIG. 11C shows an exemplary embodiment of a hub implemented within an appliance (e.g., smart washing machine, smart refrigerator, smart thermostat, other smart appliances, etc.) in accordance with one embodiment. The appliance 1680 (e.g., smart washing machine) includes a hub 1682.

FIG. 11D shows an exemplary embodiment of an exploded view of a block diagram of a hub 1684 implemented within an appliance (e.g., smart washing machine, smart refrigerator, smart thermostat, other smart appliances, etc.) in accordance with one embodiment. The hub includes a power supply 1686 that provides power (e.g., DC power supply) to a controller circuit 1690 via a connection 1696 (e.g., communication link, signal line, electrical connection, etc.) and provides power to RF circuitry 1692 via a connection 1698 (e.g., communication link, signal line, electrical connection, etc.). The controller circuit 1690 includes memory 1691 or is coupled to memory that stores instructions which are executed by processing logic 1688 (e.g., one or more processing units) of the controller circuit 1690 for controlling operations of the hub for forming, monitoring, and performing localization of the wireless asymmetrical network as discussed herein. The RF circuitry 1692 may include a transceiver or separate transmitter 1694 and receiver 1695 functionality for sending and receiving bi-directional communications via antenna(s) 1699 with the wireless sensor nodes. The RF circuitry 1692 communicates bi-directionally with the controller circuit 1690 via a connection 1689 (e.g., communication link, signal line, electrical connection, etc.). The hub 1684 can be a wireless control device 1684 or the controller circuit 1690, RF circuitry 1692, and antenna(s) 1699 in combination may form the wireless control device as discussed herein.

In one embodiment, an apparatus (e.g., hub) for providing a wireless asymmetric network architecture includes a memory for storing instructions, processing logic (e.g., one or more processing units, processing logic 1544, processing logic 1663, processing logic 1688, processing logic 1763, processing logic 1888) of the hub to execute instructions to establish and control communications in a wireless asymmetric network architecture, and radio frequency (RF) circuitry (e.g., RF circuitry 1550, RF circuitry 1670, RF circuitry 1692, RF circuitry 1890) including multiple antennas (e.g., antenna(s) 1552, antenna(s) 1678, antenna(s) 1699, antennas 1311, 1312, and 1313, etc.) to transmit and receive communications in the wireless asymmetric network architecture. The RF circuitry and multiple antennas to transmit communications to a plurality of sensor nodes (e.g., node 1, node 2) each having a wireless device with a transmitter and a receiver (or transmitter and receiver functionality of a transceiver) to enable bi-directional communications with the RF circuitry of the apparatus in the wireless asymmetric network architecture.

In one example, a first wireless node includes a wireless device with one or more processing units and RF circuitry for transmitting and receiving communications in the wireless network architecture including a first RF signal having a first packet. A second wireless node includes a wireless device with a transmitter and a receiver to enable bi-directional communications with the first wireless node in the wireless network architecture including a second RF signal with a second packet. The one or more processing units of the first wireless node are configured to execute instructions to determine distance estimates between a first plurality of wireless sensor nodes having known locations and a second plurality of wireless sensor nodes having unknown locations, determining error metric information for each distance estimate, adaptively selecting distance estimates based on the error metric information, and determining location information for the second plurality of wireless sensor nodes based on the adaptively selected distance estimates.

In one example, the apparatus is powered by a mains electrical source and the plurality of sensor nodes are each powered by a battery source to form the wireless network architecture.

Various batteries could be used in the wireless sensor nodes, including lithium-based chemistries such as Lithium Ion, Lithium Polymer, Lithium Phosphate, and other such chemistries as would be apparent to one of ordinary skill in the art. Additional chemistries that could be used include Nickel metal hydride, standard alkaline battery chemistries, Silver Zinc and Zinc Air battery chemistries, standard Carbon Zinc battery chemistries, lead Acid battery chemistries, or any other chemistry as would be obvious to one of ordinary skill in the art.

The present invention also relates to an apparatus for performing the operations described herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method operations.

Figure 12:
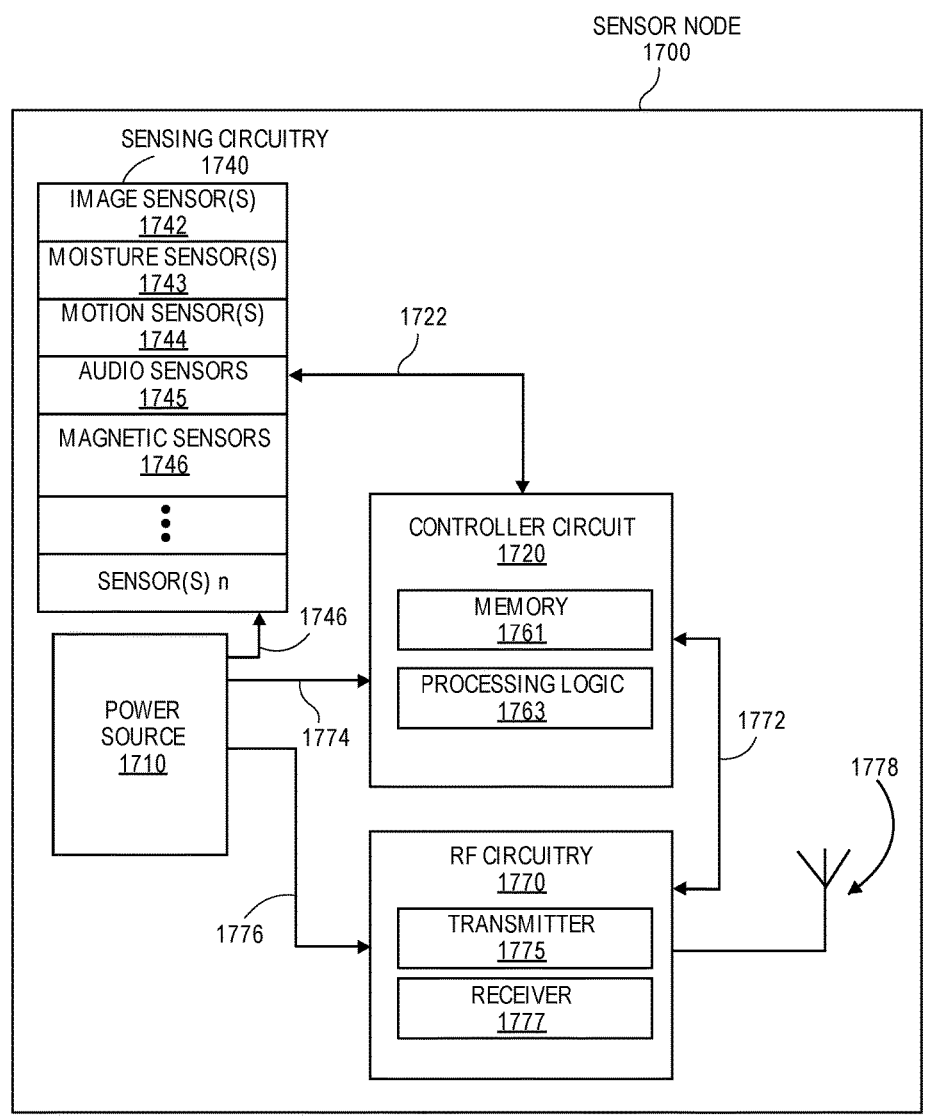
FIG. 12 illustrates a block diagram of a sensor node in accordance with one embodiment.

FIG. 12 illustrates a block diagram of a sensor node in accordance with one embodiment. The sensor node 1700 includes a power source 1710 (e.g., energy source, battery source, primary cell, rechargeable cell, etc.) that provides power (e.g., DC power supply) to a controller circuit 1720 via a connection 1774 (e.g., communication link, signal line, electrical connection, etc.), provides power to RF circuitry 1770 via a connection 1776 (e.g., communication link, signal line, electrical connection, etc.), and provides power to sensing circuitry 1740 via a connection 1746 (e.g., communication link, signal line, electrical connection, etc.). The controller circuit 1720 includes memory 1761 or is coupled to memory that stores instructions which are executed by processing logic 1763 (e.g., one or more processing units) of the controller circuit 1720 for controlling operations of the sensor node for forming and monitoring the wireless asymmetrical network as discussed herein. The RF circuitry 1770 (e.g., communication circuitry) may include a transceiver or separate transmitter 1775 and receiver 1777 functionality for sending and receiving bi-directional communications via antenna(s) 1778 with the hub(s) and optional wireless sensor nodes. The RF circuitry 1770 communicates bi-directionally with the controller circuit 1720 via a connection 1772 (e.g., electrical connection). The sensing circuitry 1740 includes various types of sensing circuitry and sensor(s) including image sensor(s) and circuitry 1742, moisture sensor(s) and circuitry 1743, temperature sensor(s) and circuitry, humidity sensor(s) and circuitry, air quality sensor(s) and circuitry, light sensor(s) and circuitry, motion sensor(s) and circuitry 1744, audio sensor(s) and circuitry 1745, magnetic sensor(s) and circuitry 1746, and sensor(s) and circuitry n, etc.

The wireless localization techniques disclosed herein may be combined with other sensed information to improve localization accuracy of the overall network. For example, in wireless sensors in which one or more of the nodes contain cameras, captured images can be used with image processing and machine learning techniques to determine whether the sensor nodes that are being monitored are looking at the same scene and are therefore likely in the same room. Similar benefits can be achieved by using periodic illumination and photodetectors. By strobing the illumination and detecting using the photodetectors, the presence of an optical path can be detected, likely indicating the absence of opaque walls between the strobe and the detector. In other embodiments, magnetic sensors can be integrated into the sensor nodes and used as a compass to detect the orientation of the sensor node that is being monitored. This information can then be used along with localization information to determine whether the sensor is on the wall, floor, ceiling, or other location.

In one example, each sensor node may include an image sensor and each perimeter wall of a house includes one or more sensor nodes. A hub analyzes sensor data including image data and optionally orientation data along with localization information to determine absolute locations for each sensor node. The hub can then build a three dimensional image of each room of a building for a user. A floor plan can be generated with locations for walls, windows, doors, etc. Image sensors may capture images indicating a change in reflections that can indicate home integrity issues (e.g., water, leaking roof, etc.).

Figure 13:
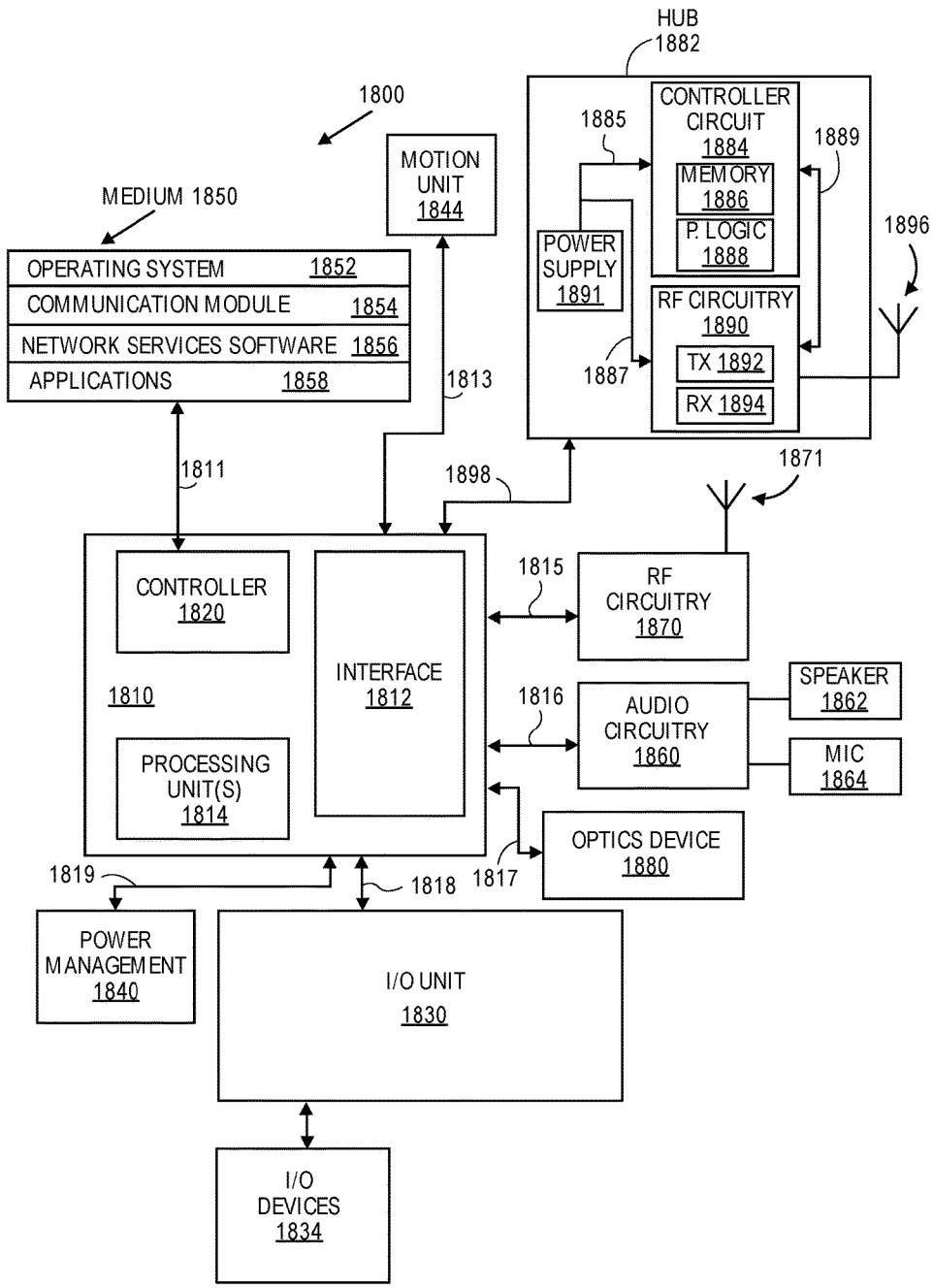
FIG. 13 illustrates a block diagram of a system or appliance 1800 having a hub in accordance with one embodiment.

FIG. 13 illustrates a block diagram of a system 1800 having a hub in accordance with one embodiment. The system 1800 includes or is integrated with a hub 1882 or central hub of a wireless asymmetric network architecture. The system 1800 (e.g., computing device, smart TV, smart appliance, communication system, etc.) may communicate with any type of wireless device (e.g., cellular phone, wireless phone, tablet, computing device, smart TV, smart appliance, etc.) for sending and receiving wireless communications. The system 1800 includes a processing system 1810 that includes a controller 1820 and processing units 1814. The processing system 1810 communicates with the hub 1882, an Input/Output (I/O) unit 1830, radio frequency (RF) circuitry 1870, audio circuitry 1860, an optics device 1880 for capturing one or more images or video, an optional motion unit 1844 (e.g., an accelerometer, gyroscope, etc.) for determining motion data (e.g., in three dimensions) for the system 1800, a power management system 1840, and machine-accessible non-transitory medium 1850 via one or more bi-directional communication links or signal lines 1898, 1818, 1815, 1816, 1817, 1813, 1819, 1811, respectively.

The hub 1882 includes a power supply 1891 that provides power (e.g., DC power supply) to a controller circuit 1884 via a connection 1885 (e.g., communication link, signal line, electrical connection, etc.) and provides power to RF circuitry 1890 via a connection 1887 (e.g., communication link, signal line, electrical connection, etc.). The controller circuit 1884 includes memory 1886 or is coupled to memory that stores instructions which are executed by processing logic 1888 (e.g., one or more processing units) of the controller circuit 1884 for controlling operations of the hub for forming and monitoring the wireless asymmetrical network as discussed herein. The RF circuitry 1890 may include a transceiver or separate transmitter (TX) 1892 and receiver (RX) 1894 functionality for sending and receiving bi-directional communications via antenna(s) 1896 with the wireless sensor nodes or other hubs. The RF circuitry 1890 communicates bi-directionally with the controller circuit 1884 via a connection 1889 (e.g., communication link, signal line, electrical connection, etc.). The hub 1882 can be a wireless control device 1884 or the controller circuit 1884, RF circuitry 1890, and antenna(s) 1896 in combination may form the wireless control device as discussed herein.

RF circuitry 1870 and antenna(s) 1871 of the system or RF circuitry 1890 and antenna(s) 1896 of the hub 1882 are used to send and receive information over a wireless link or network to one or more other wireless devices of the hubs or sensors nodes discussed herein. Audio circuitry 1860 is coupled to audio speaker 1862 and microphone 1064 and includes known circuitry for processing voice signals. One or more processing units 1814 communicate with one or more machine-accessible non-transitory mediums 1850 (e.g., computer-readable medium) via controller 1820. Medium 1850 can be any device or medium (e.g., storage device, storage medium) that can store code and/or data for use by one or more processing units 1814. Medium 1850 can include a memory hierarchy, including but not limited to cache, main memory and secondary memory.

The medium 1850 or memory 1886 stores one or more sets of instructions (or software) embodying any one or more of the methodologies or functions described herein. The software may include an operating system 1852, network services software 1856 for establishing, monitoring, and controlling wireless asymmetric network architectures, communications module 1854, and applications 1858 (e.g., home or building security applications, home or building integrity applications, developer applications, etc.). The software may also reside, completely or at least partially, within the medium 1850, memory 1886, processing logic 1888, or within the processing units 1814 during execution thereof by the device 1800. The components shown in FIG. 18 may be implemented in hardware, software, firmware or any combination thereof, including one or more signal processing and/or application specific integrated circuits.

Communication module 1854 enables communication with other devices. The I/O unit 1830 communicates with different types of input/output (I/O) devices 1834 (e.g., a display, a liquid crystal display (LCD), a plasma display, a cathode ray tube (CRT), touch display device, or touch screen for receiving user input and displaying output, an optional alphanumeric input device).

Any of the following examples can be combined into a single embodiment or these examples can be separate embodiments. In one example, a system for localization of nodes in a wireless network architecture includes a first plurality of wireless sensor nodes each having a known location and a wireless device with one or more processing units and RF circuitry for transmitting and receiving communications in the wireless network architecture. The system includes a second plurality of wireless sensor nodes each having an unknown location and a wireless device with RF circuitry for transmitting and receiving communications in the wireless network architecture. The one or more processing units of a wireless sensor node of the first plurality of wireless nodes are configured to execute instructions to determine distance estimates between the first plurality of wireless sensor nodes and the second plurality of wireless sensor nodes for localization, determine error metric information for each distance estimate, and adaptively select the determined distance estimates for localization based on the error metric information.

In another example, the error metric information comprises an error metric that is associated with each distance estimate between a wireless sensor node having a known location and a wireless sensor node having an unknown location.

In another example, the one or more processing units of the wireless sensor node of the first plurality of wireless nodes are configured to execute instructions to compare each error metric with an error threshold and adaptively select a subset of the determined distance estimates for localization based on error metrics that are less than or equal to the error threshold.

In another example, the one or more processing units of the wireless sensor node of the first plurality of wireless nodes are configured to execute instructions to determine location estimates for localization based on the subset of the determined distance estimates with at least one distance estimate and associated wireless sensor node having a known location being excluded for determining the location estimates.

In another example, the error threshold is predefined based on an environment, distance measurements, an optimization procedure, or adaptively defined during the localization. In another example, the one or more processing units of the wireless sensor node of the first plurality of wireless nodes are configured to execute instructions to compare each error metric with an error threshold or adaptively apply weighting factors to the metrics to deemphasize distance estimates having low quality of distance measurement.

In another example, the one or more processing units of the wireless sensor node of the first plurality of wireless nodes are configured to execute instructions to determine revised location repeatedly for at least one wireless sensor node by using at least two of the following: the known locations of the first plurality of nodes, prior distance estimates and their associated error metrics from the localization between the first and second plurality of sensor nodes, repeated distance estimates between the nodes of the second plurality of nodes, the estimated locations of the second plurality of nodes from either the localization between the first and second plurality of sensor nodes or from an earlier revised location and, adaptively selecting the determined distance estimates used for the location in each revised localization round.

In another example, the one or more processing units of the wireless sensor node of the first plurality of wireless nodes are configured to execute instructions to determine localization repeatedly for at least one wireless sensor node based on a first subset of the distance estimates and associated error metrics or based on a modified influence of a second subset of the distance estimates and associated error metrics.

In one example, a computer-implemented method for localization of wireless sensor nodes in a wireless network architecture includes determining distance estimates between each of a first plurality of wireless sensor nodes having known locations and a second plurality of wireless sensor nodes having unknown locations, determining error metric information for each distance estimate, adaptively selecting distance estimates based on the error metric information and determining location information for the second plurality of wireless sensor nodes based on the adaptively selected distance estimates.

In another example, the error metric information comprises error metrics with an error metric being associated with each distance estimate between a wireless sensor node having a known location and a wireless sensor node having an unknown location.

In another example, the computer-implemented method further includes comparing each error metric with an error threshold and adaptively selecting a subset of the determined distance estimates for localization based on error metrics that are less than or equal to the error threshold.

In another example, the computer-implemented method further includes determining location estimates for localization based on the subset of the determined distance estimates with at least one distance estimate and associated wireless sensor node having a known location being excluded for determining the location estimates.

In another example, the error threshold is predefined based on an environment, distance measurements, an optimization procedure, or adaptively defined during the localization.

In another example, the computer-implemented method further includes repeating the determining of the location information for the second plurality of wireless sensor nodes at least once with at least one distance estimate and associated wireless sensor node having a known location being excluded or with at least one distance estimate and associated wireless sensor node having a known location that has a modified influence.

In another example, the error metrics include an error metric that is determined based on a difference between a distance estimate for a first node with a known location and a second node with an unknown location and a calculated distance between the first and second nodes that is based on triangulation.

In another example, the error metrics are determined based on location estimates of the location information and prior knowledge of an environment of the wireless network architecture such that any disadvantaged distance estimates are excluded or an associated error metric of a disadvantaged distance estimate is adjusted with a higher error metric.

In one example, an apparatus includes a memory for storing instructions, one or more processing units to execute instructions for controlling a plurality of sensor nodes in a wireless network architecture and determining locations of the plurality of sensor nodes, and radio frequency (RF) circuitry to transmit communications to and receive communications from the plurality of sensor nodes each having a wireless device with a transmitter and a receiver to enable bi-directional communications with the RF circuitry of the apparatus in the wireless network architecture. The one or more processing units of the apparatus are configured to execute instructions to determine distance estimates between a first plurality of wireless sensor nodes having known locations and a second plurality of wireless sensor nodes having unknown locations, determine error metric information for each distance estimate, adaptively select distance estimates based on the error metric information, and determine location information for the second plurality of wireless sensor nodes based on the adaptively selected distance estimates.

In another example, the error metric information includes error metrics with an error metric being associated with each distance estimate between a wireless sensor node having a known location and a wireless sensor node having an unknown location.

In another example, the one or more processing units of the apparatus are further configured to execute instructions to compare each error metric with an error threshold and adaptively select a subset of the determined distance estimates for localization based on error metrics that are less than or equal to the error threshold.

In another example, the one or more processing units of the apparatus are further configured to execute instructions to determine location estimates for localization based on the subset of the determined distance estimates with at least one distance estimate and associated wireless sensor node having a known location being excluded for determining the location estimates.

In another example, the error metrics are determined based on a received quality of signal including signal strength of communication (RSSI) or ranging measurement signals.

In another example, the distance estimates between a first plurality of wireless sensor nodes having known locations and a second plurality of wireless sensor nodes having unknown locations includes multiple paths between a first node of the first plurality of wireless sensors nodes and a second node of the second plurality of wireless nodes.

In another example, a system for localization of nodes in a wireless network architecture includes a first plurality of wireless sensor nodes each having a known location and a wireless device with one or more processing units and RF circuitry for transmitting and receiving communications in the wireless network architecture, a second plurality of wireless sensor nodes each having an unknown location and a wireless device with RF circuitry for transmitting and receiving communications in the wireless network architecture, and a remote device having one or more processing units. The one or more processing units of the remote device are configured to execute instructions to determine distance estimates between the first plurality of wireless sensor nodes and the second plurality of wireless sensor nodes for localization, determine error metric information for each distance estimate, and adaptively select the determined distance estimates for localization based on the error metric information.

In another example, the error metric information comprises an error metric that is associated with each distance estimate between a wireless sensor node having a known location and a wireless sensor node having an unknown location.

In another example, the one or more processing units of the remote device are configured to execute instructions to compare each error metric with an error threshold and adaptively select a subset of the determined distance estimates for localization based on error metrics that are less than or equal to the error threshold.

In another example, the remote device has a different location than a location of the wireless network architecture.

In the foregoing specification, the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A system for localization of nodes in a wireless network architecture, comprising:
 a first plurality of wireless nodes each having a known location and including a wireless device with one or more processing units and RF circuitry for transmitting and receiving communications in the wireless network architecture; and
 a second plurality of wireless sensor nodes each having an unknown location and including a wireless device with RF circuitry for transmitting and receiving communications in the wireless network architecture,
 wherein the one or more processing units of a wireless node of the first plurality of wireless nodes to configure the second plurality of wireless sensor nodes as a mesh-based network architecture for a time period sufficient for localization, determine distance estimates between the wireless node of the first plurality of wireless nodes and each of the second plurality of wireless sensor nodes for localization, determine error metric information for each distance estimate, adaptively select the determined distance estimates for localization based on the error metric information, and configure the wireless network architecture in a tree based network architecture upon completion of localization.

2. The system of claim 1, wherein the error metric information comprises an error metric that is associated with each distance estimate between a wireless node having a known location and a wireless sensor node having an unknown location.

3. The system of claim 2, wherein the one or more processing units of the wireless node of the first plurality of wireless nodes are configured to execute instructions to compare each error metric with an error threshold and adaptively select a subset of the determined distance estimates for localization based on error metrics that are less than or equal to the error threshold.

4. The system of claim 3, wherein the one or more processing units of the wireless node of the first plurality of wireless nodes are configured to execute instructions to determine location estimates for localization based on the subset of the determined distance estimates with at least one distance estimate and associated wireless node having a known location being excluded for determining the location estimates.

5. The system of claim 3, wherein the error threshold is predefined based on an environment, distance measurements, an optimization procedure, or adaptively defined during the localization.

6. The system of claim 2, wherein the one or more processing units of the wireless node of the first plurality of wireless nodes are configured to execute instructions to compare each error metric with an error threshold or adaptively apply weighting factors to the metrics to deemphasize distance estimates having low quality of distance measurement.

7. The system of claim 2, wherein the one or more processing units of the wireless node of the first plurality of wireless nodes are configured to execute instructions to determine revised location repeatedly for at least one wireless sensor node by using at least two of the following: the known locations of the first plurality of wireless nodes, prior distance estimates and their associated error metrics from the localization between the first plurality of wireless nodes and the second plurality of wireless sensor nodes, repeated distance estimates between the nodes of the second plurality of wireless sensor nodes, the estimated locations of the second plurality of wireless sensor nodes from either the localization between the first plurality of wireless nodes and the second plurality of wireless sensor nodes or from an earlier revised location and, adaptively selecting the determined distance estimates used for the location in each revised localization round.

8. The system of claim 7, wherein the one or more processing units of the wireless sensor node of the first plurality of wireless nodes are configured to execute instructions to determine localization repeatedly for at least one wireless sensor node based on a first subset of the distance estimates and associated error metrics or based on a modified influence of a second subset of the distance estimates and associated error metrics.

9. A computer-implemented method for localization of wireless sensor nodes in a wireless network architecture, comprising:
  determining distance estimates between each of a first plurality of wireless sensor nodes having known locations and a second plurality of wireless sensor nodes having unknown locations;
  determining error metric information for each distance estimate based on measuring distance estimates using time of flight information, using received signal strength indication (RSSI) to indicate quality of the measured distance estimates, and calculating distance estimates during anchor-based triangulation;
  adaptively selecting distance estimates based on the error metric information; and
  determining location information for the second plurality of wireless sensor nodes based on the adaptively selected distance estimates.

10. The computer-implemented method of claim 9, wherein the error metric information comprises error metrics with an error metric being associated with each distance estimate between a wireless sensor node having a known location and a wireless sensor node having an unknown location.

11. The computer-implemented method of claim 10, further comprising:
  comparing each error metric with an error threshold and adaptively selecting a subset of the determined distance estimates for localization based on error metrics that are less than or equal to the error threshold.

12. The computer-implemented method of claim 11, further comprising:
  determining location estimates for localization based on the subset of the determined distance estimates with at least one distance estimate and associated wireless sensor node having a known location being excluded for determining the location estimates.

13. The computer-implemented method of claim 10, wherein the error threshold is predefined based on an environment, distance measurements, an optimization procedure, or adaptively defined during the localization.

14. The computer-implemented method of claim 9, further comprising:
  repeating the determining of the location information for the second plurality of wireless sensor nodes at least once with at least one distance estimate and associated wireless sensor node having a known location being excluded or with at least one distance estimate and associated wireless sensor node having a known location that has a modified influence.

15. The computer-implemented method of claim 10, wherein the error metrics include an error metric that is determined based on a difference between a distance estimate for a first node with a known location and a second node with an unknown location using time of flight information and a calculated distance between the first and second nodes that is based on triangulation.

16. The computer-implemented method of claim 10, wherein the error metrics are determined based on location estimates of the location information and prior knowledge of an environment of the wireless network architecture such that any disadvantaged distance estimates are excluded or an associated error metric of a disadvantaged distance estimate is adjusted with a higher error metric.

17. An apparatus, comprising:
  a memory for storing instructions;
  one or more processing units to execute instructions for controlling a plurality of wireless sensor nodes in a wireless network architecture and determining locations of the plurality of wireless sensor nodes; and
  radio frequency (RF) circuitry to transmit communications to and receive communications from the plurality of wireless sensor nodes each having a wireless device with a transmitter and a receiver to enable bi-directional communications with the RF circuitry of the apparatus in the wireless network architecture, wherein the one or more processing units of the apparatus are configured to execute instructions to configure the plurality of wireless sensor nodes as a mesh-based network architecture for a time period sufficient for localization, determine distance estimates between the apparatus having a known location and the plurality of wireless sensor nodes having unknown locations, determine error metric information for each distance estimate, adaptively select distance estimates based on the error metric information, and determine location information for the plurality of wireless sensor nodes based on the adaptively selected distance estimates, and configure the wireless network architecture in a tree based network architecture upon completion of localization.

18. The apparatus of claim 17, wherein the one or more processing units of the apparatus are further configured to execute instructions to determine or receive a distance estimate between a wireless sensor node having a known location and a wireless sensor node having an unknown location, wherein the error metric information comprises error metrics with an error metric being associated with each distance estimate between the apparatus and the plurality of wireless sensor nodes, and with an error metric being associated with the distance estimate between the wireless sensor node having a known location and the wireless sensor node having an unknown location.

19. The apparatus of claim 18, wherein the one or more processing units of the apparatus are further configured to execute instructions to compare each error metric with an error threshold and adaptively select a subset of the determined distance estimates for localization based on error metrics that are less than or equal to the error threshold.

20. The apparatus of claim 19, wherein the one or more processing units of the apparatus are further configured to execute instructions to determine location estimates for localization based on the subset of the determined distance estimates with at least one distance estimate and associated wireless sensor node having a known location being excluded for determining the location estimates.

21. The apparatus of claim 18, wherein the error metrics are determined based on a received quality of signal including signal strength of communication (RSSI) or ranging measurement signals.

22. The apparatus of claim 17, wherein the distance estimates between the apparatus and the plurality of wireless sensor nodes having unknown locations includes multiple paths between the apparatus and a node of the plurality of wireless nodes.

23. A system for localization of nodes in a wireless network architecture, comprising:
   a first plurality of wireless sensor nodes each having a known location and a wireless device with one or more processing units and RF circuitry for transmitting and receiving communications in the wireless network architecture;
   a second plurality of wireless sensor nodes each having an unknown location and a wireless device with RF circuitry for transmitting and receiving communications in the wireless network architecture; and
   a remote device having one or more processing unit, wherein the one or more processing units of the remote device are configured to execute instructions to determine distance estimates between the first plurality of wireless sensor nodes and the second plurality of wireless sensor nodes for localization, determine error metric information for each distance estimate based on measuring distance estimates using time of flight information, using received signal strength indication (RSSI) to indicate quality of the measured distance estimates, and calculating distance estimates during anchor-based triangulation, and adaptively select the determined distance estimates for localization based on the error metric information.

24. The system of claim 23, wherein the error metric information comprises an error metric that is associated with each distance estimate between a wireless sensor node having a known location and a wireless sensor node having an unknown location.

25. The system of claim 24, wherein the one or more processing units of the remote device are configured to execute instructions to compare each error metric with an error threshold and adaptively select a subset of the determined distance estimates for localization based on error metrics that are less than or equal to the error threshold.

26. The system of claim 23, wherein the remote device has a different location than a location of the wireless network architecture.

* * * * *